United States Patent
Barany

(10) Patent No.: US 9,883,454 B2
(45) Date of Patent: *Jan. 30, 2018

(54) FEEDBACK MESSAGE ALIGNMENT FOR MULTICARRIER SYSTEMS WITH FLEXIBLE BANDWIDTH CARRIER

(71) Applicant: QUALCOMM Incorporated, San Diego, CA (US)

(72) Inventor: Peter Anthony Barany, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/041,735

(22) Filed: Sep. 30, 2013

(65) Prior Publication Data

US 2014/0307717 A1    Oct. 16, 2014

Related U.S. Application Data

(60) Provisional application No. 61/812,164, filed on Apr. 15, 2013.

(51) Int. Cl.
*H04W 52/02* (2009.01)
*H04L 5/00* (2006.01)
*H04W 76/04* (2009.01)

(52) U.S. Cl.
CPC ............ *H04W 52/02* (2013.01); *H04L 5/001* (2013.01); *H04L 5/0055* (2013.01);
(Continued)

(58) Field of Classification Search
CPC ..... H04L 5/0064; H04L 5/001; H04L 5/0055; H04L 5/0098; H04W 52/02; H04W 76/048; H04W 76/04
See application file for complete search history.

(56) References Cited

U.S. PATENT DOCUMENTS 6,775,242 B2 *  8/2004  Grilli ................... H04B 7/2668
                                                      370/252
7,953,119 B2 *  5/2011  Cho ..................... H04J 11/0093
                                                      370/328
(Continued)

FOREIGN PATENT DOCUMENTS

CN          102577552 A       7/2012
EP            2469939 A1      6/2012
(Continued)

OTHER PUBLICATIONS

Huawei et al., "Introduction of S-UMTS," 3GPP TSG-RAN WG1 Meeting #72, R1-130514 3GPP Draft, St. Julian's, Malta, Jan. 28-Feb. 1, 2013, downloaded from http://www.3gpp.org/ftp/tsg_ran/wg1_rl1/TSGR1_72/Docs/, 7 pgs.

(Continued)

*Primary Examiner* — Ian N Moore
*Assistant Examiner* — Mewale Ambaye
(74) *Attorney, Agent, or Firm* — Holland & Hart LLP

(57) ABSTRACT

Methods, systems, and devices are provided for signaling alignment for multicarrier systems that may utilize one or more flexible bandwidth carriers. Tools and techniques are provided that may help ensure signaling alignment with respect to feedback messages, such as ACK/NACK messages, in multicarrier systems that may utilize one or more flexible bandwidth carriers and/or systems that may utilize multiple different flexible bandwidth carriers. Some methods may include identifying timing for one or more subframes that carry one or more feedback messages for a first cell; and/or adjusting a timing for one or more subframes that carry one or more feedback messages for a second cell to align with the one or more subframes that carry the one or more feedback messages for the first cell. The first cell (Continued)

and/or the second cell may include at least one of the one or more flexible bandwidth carriers.

32 Claims, 16 Drawing Sheets

(52) U.S. Cl.
CPC ......... *H04W 76/048* (2013.01); *H04L 5/0023* (2013.01); *H04L 5/0098* (2013.01); *Y02B 60/50* (2013.01)

(56) References Cited

U.S. PATENT DOCUMENTS

| | | | |
|---|---|---|---|
| 8,325,670 B2* | 12/2012 | Afrashteh | H04B 7/2621 370/322 |
| 2003/0007470 A1 | 1/2003 | Grilli et al. | |
| 2005/0207385 A1* | 9/2005 | Gorokhov | H04L 5/0037 370/344 |
| 2009/0180414 A1 | 7/2009 | Maeda et al. | |
| 2009/0296643 A1 | 12/2009 | Cave et al. | |
| 2010/0323683 A1* | 12/2010 | Kazmi | H04W 64/00 455/422.1 |
| 2011/0002281 A1 | 1/2011 | Terry et al. | |
| 2011/0170420 A1 | 7/2011 | Xi et al. | |
| 2011/0294491 A1 | 12/2011 | Fong et al. | |
| 2012/0082145 A1* | 4/2012 | Chen | H04L 1/0029 370/338 |
| 2012/0176950 A1 | 7/2012 | Zhang et al. | |
| 2012/0307689 A1 | 12/2012 | Kim et al. | |
| 2013/0064191 A1 | 3/2013 | Jeong et al. | |
| 2013/0114473 A1 | 5/2013 | Awoniyi et al. | |
| 2013/0121265 A1 | 5/2013 | Awoniyi et al. | |
| 2013/0153298 A1* | 6/2013 | Pietraski | E21B 7/04 175/45 |
| 2013/0176952 A1* | 7/2013 | Shin | H04L 5/001 370/329 |
| 2014/0036742 A1 | 2/2014 | Charbit et al. | |
| 2014/0185467 A1* | 7/2014 | Heo | H04W 52/54 370/252 |
| 2014/0307603 A1 | 10/2014 | Barany | |
| 2016/0014691 A1* | 1/2016 | Rastogi | H04W 52/0209 370/311 |

FOREIGN PATENT DOCUMENTS

| | | | |
|---|---|---|---|
| KR | 2012004852 | * | 1/2013 |
| KR | 20130005625 A | | 1/2013 |
| TW | 201112819 A | | 4/2011 |
| WO | WO 2010/078365 | * | 7/2010 |
| WO | WO-2010078365 A1 | | 7/2010 |
| WO | WO2010078365 | * | 8/2010 |
| WO | WO-2010147956 A2 | | 12/2010 |
| WO | WO-2012024331 A1 | | 2/2012 |
| WO | WO-2012044694 A1 | | 4/2012 |
| WO | WO2012/139274 | * | 10/2012 |
| WO | WO-2012139274 A1 | | 10/2012 |

OTHER PUBLICATIONS

ISA/EPO, International Search Report and Written Opinion of the International Searching Authority, Int'l. App. No. PCT/US2014/033201, dated Sep. 25, 2014, European Patent Office, Rijswijk, NL, 12 pgs.

ISA/EPO, International Search Report and Written Opinion of the International Searching Authority, Int'l. App. No. PCT/US2014/033202, dated Sep. 25, 2014, European Patent Office, Rijswijk, NL, 12 pgs.

Qualcomm Incorporated, "Flexible Bandwidth Usage for UMTS FDD," 3GPP TSG-RAN WG1 Meeting #71, R1-125194 3GPP Draft, New Orleans, US, Nov. 12-16, 2012, downloaded from http://www.3gpp.org/ftp/tsg_ran/wg1_rl1/TSGR1_71/Docs/, 12 pgs.

3GPP TSG RAN WG1 Meeting #60bis: DAI Design for LTE-A TDD, Samsung, R1-102177, Beijing, CN, Apr. 12-16, 2010, 5 pgs.

3GPP TSG-RAN WG2 Meeting #66: DRX with Carrier Aggregation in LTE-Advanced, Ericsson, R2-092959, San Francisco, US, May 4-8, 2009, 3 pgs.

IPEA/EPO, Second Written Opinion of the International Preliminary Examining Authority, Int'l. App. No. PCT/US2014/033201, dated Mar. 25, 2015, European Patent Office, Berlin, DE, 7 pgs.

ISA/EPO, Second Written Opinion of the International Preliminary Examining Authority, Int'l. App. No. PCT/US2014/033202, dated Apr. 22, 2015, European Patent Office, Berlin, DE, 7 pgs.

* cited by examiner

FEEDBACK MESSAGE ALIGNMENT FOR MULTICARRIER SYSTEMS WITH FLEXIBLE BANDWIDTH CARRIER

CROSS REFERENCES

The present application claims priority to U.S. Provisional Patent Application No. 61/812,164, titled: "SIGNALING ALIGNMENT FOR MULTICARRIER SYSTEMS WITH FLEXIBLE BANDWIDTH CARRIER," filed on Apr. 15, 2013, assigned to the assignee hereof, and expressly incorporated by reference herein for all purposes.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiples of channel bandwidths, hence there may be unutilized parts of the spectrum. As the use of wireless devices has increased, the demand for and value of this spectrum has generally surged, as well. Nonetheless, in some cases, wireless communications systems may not utilize portions of the allocated spectrum because the portions are not big enough to fit a standard or normal waveform. The developers of the LTE standard, for example, recognized the problem and decided to support many different system bandwidths (e.g., 1.4, 3, 5, 10, 15 and 20 MHz). This may provide one partial solution to the problem.

Flexible bandwidth systems, also referred to herein as scalable bandwidth systems, may provide for better utilization of bandwidth resources. However, some flexible bandwidth systems may face timing issues, including signaling alignment, when they include multiple carriers that utilize different bandwidths.

SUMMARY

Methods, systems, and devices are provided for signaling alignment for multicarrier systems that may utilize one or more flexible bandwidth carriers. For example, tools and techniques are provided that may help ensure signaling alignment, such as with respect to feedback messages, in multicarrier systems that may utilize one or more normal bandwidth carriers and one or more flexible or scalable bandwidth carriers and/or systems that may utilize multiple different flexible bandwidth carriers. Feedback messages may include acknowledgment (ACK) messages and/or negative acknowledgement (NACK) messages.

Flexible bandwidth carriers for wireless communications systems may utilize portions of spectrum that may not be big enough to fit a normal waveform utilizing flexible bandwidth waveforms. A flexible bandwidth system that utilizes a flexible bandwidth carrier may be generated with respect to a normal bandwidth system through dilating, or scaling down, the time or the chip rate of the flexible bandwidth system with respect to the normal bandwidth system. Some embodiments may increase the bandwidth of a waveform through expanding, or scaling up, the time or the chip rate of the flexible bandwidth system.

In multicarrier systems that may utilize one or more of these flexible bandwidth carriers, misalignment of feedback signaling, for example ACK/NACK signaling, between multiple carriers may cause various issues, including incomplete reception of feedback signaling that may then require retransmission. Retransmission may require the use of other multicarrier system resources (such as bandwidth), increase in power consumption to receive feedback signaling or retransmission of feedback signaling, or increased usage of time resources, such as requiring the use of more sub-frames for transmission and reception for feedback signaling, etc. These problems may be addressed by adjusting timing for one or more subframes that carry feedback messages for a second cell to align with the one or more subframes that carry feedback messages for the first cell, particularly where the first cell and/or the second cell include at least one flexible bandwidth carrier.

Some embodiments includes a method of signaling alignment in a multicarrier system that utilizes one or more flexible bandwidth carriers. The method may include: identifying a timing for one or more subframes that carry one or more feedback messages for a first cell; and/or adjusting a timing for one or more subframes that carry one or more feedback messages for a second cell to align with the one or more subframes that carry the one or more feedback messages for the first cell. At least the first cell or the second cell may include at least one of the one or more flexible bandwidth carriers.

In some embodiments, the one or more feedback messages include at least an ACK message or a NACK message. Adjusting the timing for the one or more subframes for the second cell may reduce a delay for the one or more feedback messages for the second cell relative to a standalone carrier cell. Adjusting the timing for the one or more subframes for the second cell may include an increase in a capacity of a resource used for the one or more feedback messages for both the first cell and the second cell when a bandwidth of the second cell is greater than a flexible bandwidth of the first cell. Adjusting the timing for the one or more subframes for the second cell may include a decrease in a capacity of a resource used for the one or more feedback messages for both the first cell and second cell when a flexible bandwidth of the second cell is less than a bandwidth of the first cell.

In some embodiments of the method, the first cell includes a normal bandwidth carrier and the second cell includes one of the one or more flexible bandwidth carriers. In some embodiments, the first cell may include one of the one or more flexible bandwidth carriers and the second cell may include a normal bandwidth carrier. In some embodiments, the first cell includes one of the one or more flexible bandwidth carriers and the second cell includes one of the one or more flexible bandwidth carriers different from the first cell.

The first cell may include a bandwidth scaling factor equal to 1 and the second cell may include a bandwidth scaling factor equal to 2 or 4 in some cases. The first cell may include a bandwidth scaling factor equal to 2 or 4 and the second cell may include a bandwidth scaling factor equal to 1.

Some embodiments include a system for signaling alignment with multiple carriers that utilizes one or more flexible bandwidth carriers. The system may include: means for identifying a timing for one or more subframes that carry one or more feedback messages for a first cell; and/or means for adjusting a timing for one or more subframes that carry one or more feedback messages for a second cell to align with the one or more subframes that carry the one or more feedback messages for the first cell. At least the first cell or the second cell may include at least one of the one or more flexible bandwidth carriers. In some embodiments, the one or more feedback messages include at least an ACK message or a NACK message.

The means for adjusting the timing for the one or more subframes for the second cell may reduce a delay for the one or more feedback messages the second cell relative to a standalone carrier cell. The means for adjusting the timing for the one or more subframes for the second cell may include an increase in a capacity of a resource used for the one or more feedback messages for both the first cell and the second cell when a bandwidth of the second cell is greater than a flexible bandwidth of the first cell. The means for adjusting the timing for the one or more subframes for the second cell may include a decrease in a capacity of a resource used for the one or more feedback messages for both the first cell and second cell when a flexible bandwidth of the second cell is less than a bandwidth of the first cell.

In some embodiments of the system, the first cell includes a normal bandwidth carrier and the second cell includes one of the one or more flexible bandwidth carriers. In some embodiments, the first cell may include one of the one or more flexible bandwidth carriers and the second cell may include a normal bandwidth carrier. In some embodiments, the first cell includes one of the one or more flexible bandwidth carriers and the second cell includes one of the one or more flexible bandwidth carriers different from the first cell.

The first cell may include a bandwidth scaling factor equal to 1 and the second cell may include a bandwidth scaling factor equal to 2 or 4 in some cases. The first cell may include a bandwidth scaling factor equal to 2 or 4 and the second cell may include a bandwidth scaling factor equal to 1.

Some embodiments include a computer program product for signaling alignment in a wireless communications system that may include a non-transitory computer-readable medium that may include: code for identifying a timing for one or more subframes that carry one or more feedback messages for a first cell; and/or code adjusting a timing for one or more subframes that carry one or more feedback messages for a second cell to align with the one or more subframes that carry the one or more feedback messages for the first cell. At least the first cell or the second cell may include at least one of the one or more flexible bandwidth carriers. In some embodiments, the one or more feedback messages include at least an ACK message or a NACK message.

The code for adjusting the timing for the one or more subframes for the second cell may reduce a delay for the one or more feedback messages the second cell relative to a standalone carrier cell. The code for adjusting the timing for the one or more subframes for the second cell may include code for increasing a capacity of a resource used for the one or more feedback messages for both the first cell and the second cell when a bandwidth of the second cell is greater than a flexible bandwidth of the first cell. The code for adjusting the timing for the one or more subframes for the second cell may include code for decreasing a capacity of a resource used for the one or more feedback messages for both the first cell and second cell when a flexible bandwidth of the second cell is less than a bandwidth of the first cell.

In some embodiments of the computer program product, the first cell includes a normal bandwidth carrier and the second cell includes one of the one or more flexible bandwidth carriers. In some embodiments, the first cell may include one of the one or more flexible bandwidth carriers and the second cell may include a normal bandwidth carrier. In some embodiments, the first cell includes one of the one or more flexible bandwidth carriers and the second cell includes one of the one or more flexible bandwidth carriers different from the first cell.

The first cell may include a bandwidth scaling factor equal to 1 and the second cell may include a bandwidth scaling factor equal to 2 or 4 in some cases. The first cell may include a bandwidth scaling factor equal to 2 or 4 and the second cell may include a bandwidth scaling factor equal to 1.

Some embodiments include a wireless communications device configured for signaling alignment in a wireless communications system. The device may include at least one processor that may be configured to: identify a timing for one or more subframes that carry one or more feedback messages for a first cell; and/or adjust a timing for one or more subframes that carry one or more feedback messages for a second cell to align with the one or more subframes that carry the one or more feedback messages for the first cell. At least the first cell or the second cell may include at least one of the one or more flexible bandwidth carriers. In some embodiments, the one or more feedback messages include at least an ACK message or a NACK message.

Adjusting the timing for the one or more subframes for the second cell may reduce a delay for the one or more feedback messages for the second cell relative to a standalone carrier cell. Adjusting the timing for the one or more subframes for the second cell may include an increase in a capacity of a resource used for the one or more feedback messages for both the first cell and the second cell when a bandwidth of the second cell is greater than a flexible bandwidth of the first cell. Adjusting the timing for the one or more subframes for the second cell may include a decrease in a capacity of a resource used for the one or more feedback messages for both the first cell and second cell when a flexible bandwidth of the second cell is less than a bandwidth of the first cell.

In some embodiments of the device, the first cell includes a normal bandwidth carrier and the second cell includes one of the one or more flexible bandwidth carriers. In some embodiments, the first cell may include one of the one or more flexible bandwidth carriers and the second cell may include a normal bandwidth carrier. In some embodiments, the first cell includes one of the one or more flexible bandwidth carriers and the second cell includes one of the one or more flexible bandwidth carriers different from the first cell.

The first cell may include a bandwidth scaling factor equal to 1 and the second cell may include a bandwidth scaling factor equal to 2 or 4 in some cases. The first cell may include a bandwidth scaling factor equal to 2 or 4 and the second cell may include a bandwidth scaling factor equal to 1.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
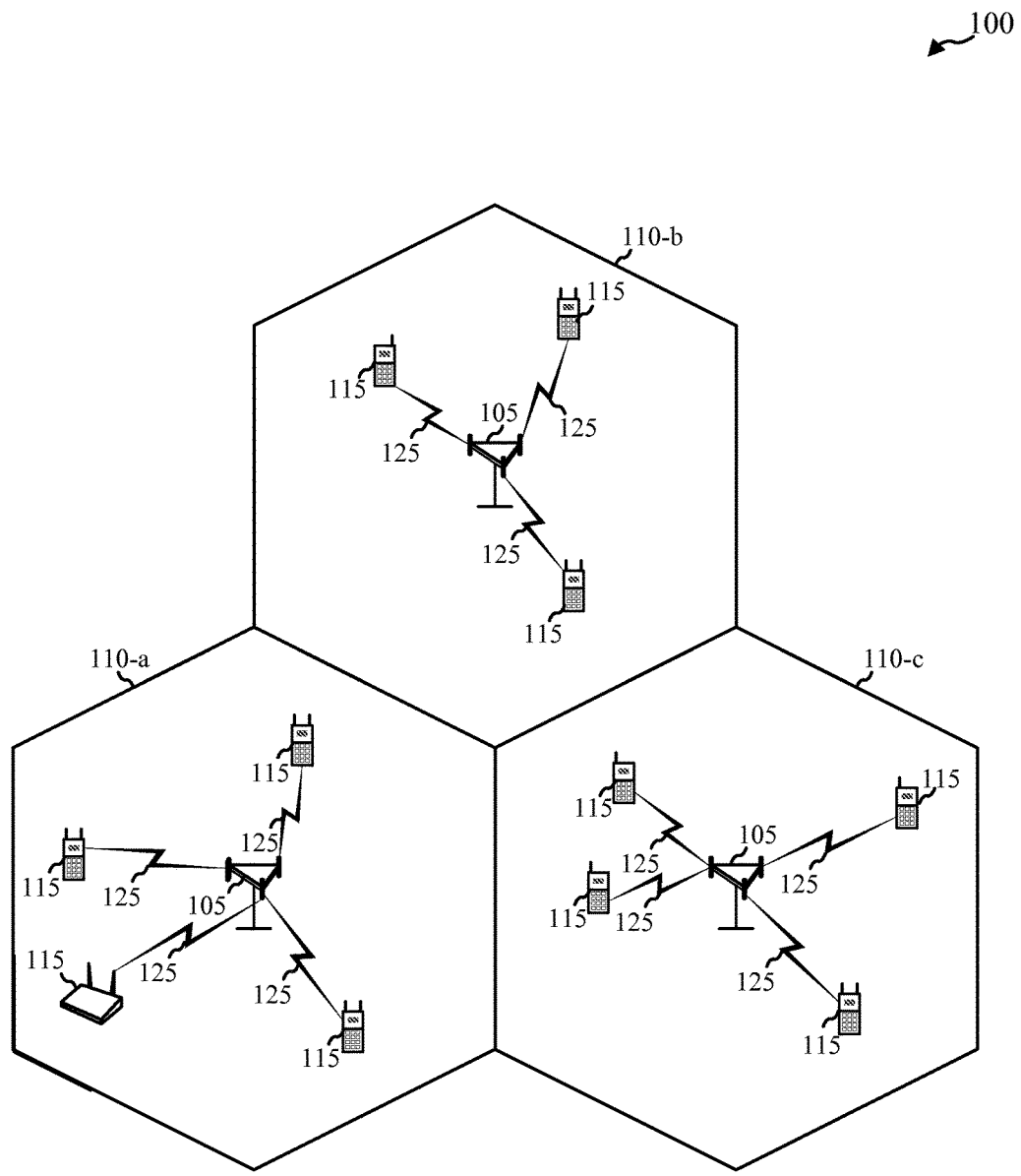
FIG. 1 shows a block diagram of a wireless communications system in accordance with various embodiments.
Figure 1:
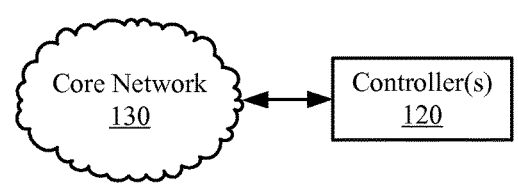

Methods, systems, and devices are provided for signaling alignment for multicarrier systems that may utilize one or more flexible bandwidth carriers. For example, tools and techniques are provided that may help ensure signaling alignment, such as with respect to feedback messages, such as ACK/NACK messages, in multicarrier systems that may utilize one or more normal bandwidth carriers and one or more flexible bandwidth carriers and/or systems that may utilize multiple different flexible bandwidth carriers.

Methods for signaling alignment may be particularly useful in a multicarrier High Speed Downlink Packet Access (HSDPA) network that utilizes a primary serving High Speed Downlink Shared Channel (HS-DSCH cell) with a normal chip rate, such as 3.84 Mcps (e.g., N=1) and a secondary serving HS-DSCH cell(s) that may utilize a time dilated chip rate=3.84/2 Mcps (e.g., N=2) or 3.84/4 Mcps (e.g., N=4) or vice versa. The methods and systems provided may accommodate the fact that only the primary serving HS-DSCH cell may transmit feedback messages, such as ACK/NACK messages, on the uplink for all carriers via a High Speed Dedicated Physical Control Channel (HS-DPCCH) of the primary serving cell in order to ensure proper signaling alignment, Flexible bandwidth carriers for wireless communications systems may utilize portions of spectrum that may not be big enough to fit a normal waveform utilizing flexible bandwidth waveforms. A flexible bandwidth system that utilizes a flexible bandwidth carrier may be generated with respect to a normal bandwidth system through dilating, or scaling down, the time or the chip rate of the flexible bandwidth system with respect to the normal bandwidth system. Some embodiments may increase the bandwidth of a waveform through expanding, or scaling up, the time or the chip rate of the flexible bandwidth system.

In multicarrier systems that may utilize one or more of these flexible bandwidth carriers, misalignment of feedback signaling, for example ACK/NACK signaling, between multiple carriers may cause various issues, including incomplete reception of feedback signaling that may then require retransmission. Retransmission may then require the use of other multicarrier system resources (such as bandwidth), increase in power consumption to receive feedback signaling or retransmission of feedback signaling, or increased usage of time resources, such as requiring the use of more sub-frames for transmission and reception for feedback signaling, etc. These problems may be addressed by adjusting timing for one or more subframes that carry feedback messages for a second cell to align with the one or more subframes that carry feedback messages for the first cell, particularly where the first cell and/or the second cell include at least one flexible bandwidth carrier.

Methods and systems for signaling alignment in a multi-carrier system that utilizes one or more flexible bandwidth carriers can include identifying timing for one or more subframes that carry one or more feedback messages for a first cell, such as ACK/NACK messages. The communication timing for one or more subframes that carry one or more feedback messages for a second cell may be adjusted to align with the one or more subframes that carry the one or more feedback messages for the first cell. Signaling alignment may be particularly useful when at least the first cell or the second cell includes at least one flexible bandwidth carrier.

Adjusting the timing for the one or more subframes for the second cell may reduce a delay for the one or more feedback messages for the second cell relative to a standalone carrier cell. Adjusting the timing for the one or more subframes for the second cell may include/require an increase in a capacity of a resource (e.g. transmission time delay) used for the one or more feedback messages for both the first cell and the second cell, when a bandwidth of the second cell is greater than a flexible bandwidth of the first cell. In some cases, adjusting the timing for the one or more subframes for the second cell may include/require a decrease in a capacity of a resource (e.g. transmission time delay) used for the one or more feedback messages for both the first cell and second cell when a flexible bandwidth of the second cell is less than a bandwidth of the first cell.

In some embodiments, the first cell may include a normal bandwidth carrier and the second cell may include one of the one or more flexible bandwidth carriers. In other embodiments, the first cell may include a flexible bandwidth carrier and the second cell may include one of the one or more flexible bandwidth carriers different from the first cell. In some cases, the flexible bandwidth of the first cell is greater than the flexible bandwidth of the second cell.

The methods for signaling alignment can also be beneficially implemented when the first cell may include one or more flexible bandwidth carriers and the second cell may include a normal bandwidth carrier. In some cases, the first cell may include one or more flexible bandwidth carriers and the second cell may include one or more flexible bandwidth carriers different from the first cell. The flexible bandwidth of the first cell may be less than the flexible bandwidth of the second cell.

In yet other cases, the methods described can be implemented where the first cell includes a bandwidth scaling factor equal to 1 and the second cell includes a bandwidth scaling factor equal to 2 or 4. In some cases, the first cell may include a bandwidth scaling factor equal to 2 or 4 and the second cell may include a bandwidth scaling factor equal to 1.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). Some systems may utilize high speed packet access (HSPA). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above, as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, user equipment 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The user equipment 115 may be any type of mobile station, user equipment, access terminal, subscriber unit, or user equipment. The user equipment 115 may include cellular phones and wireless communications devices, but may also include personal digital assistants (PDAs), smartphones, other handheld devices, netbooks, notebook computers, etc. Thus, the term user equipment should be interpreted broadly hereinafter, including the claims, to include any type of wireless or mobile communications device.

Throughout this application, some user equipment may be referred to as flexible bandwidth capable user equipment, flexible bandwidth compatible user equipment, and/or flexible bandwidth user equipment. This may generally mean that the user equipment is flexible capable or compatible. In general, these devices may also be capable of normal functionality with respect to one or more normal radio access technologies (RATs). The use of the term flexible as meaning flexible capable or flexible compatible may generally be applicable to other aspects of system 100, such as for controller 120 and/or base stations 105, or a radio access network.

The base stations 105 may wirelessly communicate with the user equipment 115 via a base station antenna. The base stations 105 may be configured to communicate with the user equipment 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the user equipment 115, the base stations 105, the core network 130, and/or the controller 120 may be configured to utilize flexible bandwidth and waveforms in accordance with various embodiments. System 100, for example, shows transmissions 125 between user equipment 115 and base stations 105. The transmissions 125 may include uplink and/or reverse link transmission, from a user equipment 115 to a base station 105, and/or downlink and/or forward link transmissions, from a base station 105 to a user equipment 115. The transmissions 125 may include flexible/scalable and/or normal waveforms. Normal waveforms may also be referred to as legacy and/or normal waveforms.

The different aspects of system 100, such as the user equipment 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the user equipment 115, the base stations 105, the core network 130, and/or the controller 120 may be configured to adapt the chip rates, spreading factor, and/or scaling factors to generate and/or utilize flexible bandwidth and/or waveforms. Some aspects of system 100 may form a flexible subsystem (such as certain user equipment 115 and/or base stations 105) that may be generated with respect to a normal subsystem (that may be implemented using other user equipment 115 and/or base stations 105) through dilating, or scaling down, the time of the flexible subsystem with respect to the time of the normal subsystem.

In some embodiments, different aspects of system 100, such as the user equipment 115, the base stations 105, the core network 130, and/or the controller 120 may be configured to identify timing for one or more subframes that carry one or more feedback messages, such as ACK/NACK messages, for a first cell. Different aspects of system 100, such as the user equipment 115, the base stations 105, the core network 130, and/or the controller 120 may be configured to adjust a timing for one or more subframes that carry one or more feedback messages for a second cell to align with the one or more subframes that carry the one or more feedback messages for the first cell. At least the first cell or the second cell may include at least one or more flexible bandwidth carriers.

Figure 2A:
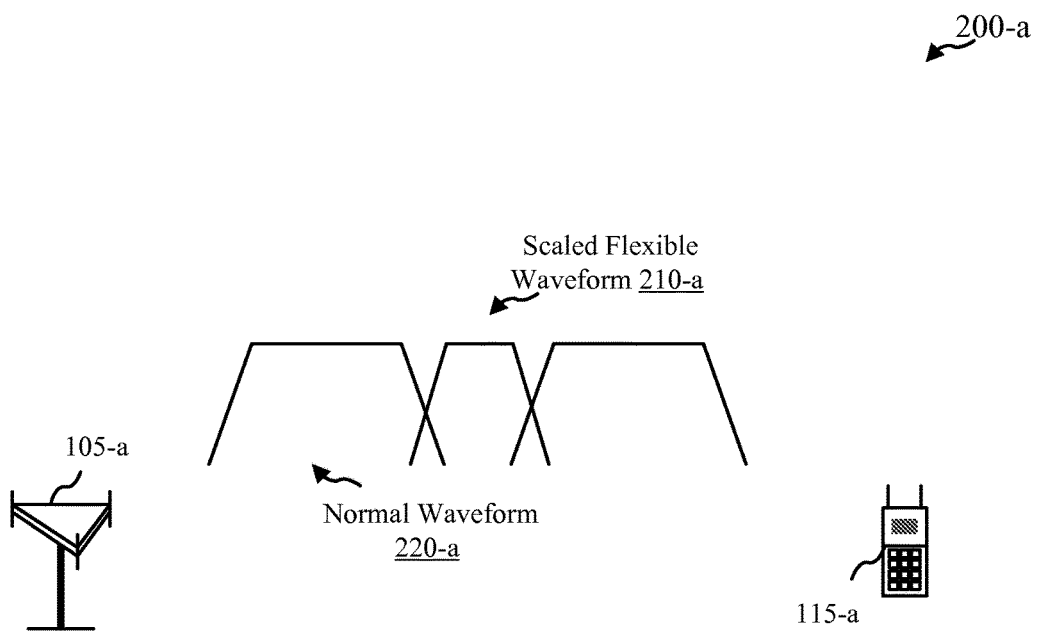
FIG. 2A shows an example of a wireless communications system where a flexible bandwidth waveform, also referred to as a scalable bandwidth waveform, fits into a portion of spectrum not broad enough to fit a normal waveform in accordance with various embodiments.

FIG. 2A shows an example of a wireless communications system 200-a with a base station 105-a and a user equipment 115-a in accordance with various embodiments, where a flexible bandwidth waveform 210-a fits into a portion of spectrum not broad enough to fit a normal waveform 220-a. System 200-a may be an example of system 100 of FIG. 1. In some embodiments, the flexible bandwidth waveform 210-a may overlap with the normal waveform 220-a that either the base 105-a and/or the user equipment 115-a may transmit. In some cases, the normal waveform 220-a may completely overlap the flexible bandwidth waveform 210-a. Some embodiments may also utilize multiple flexible bandwidth waveforms 210. In some embodiments, another base station and/or user equipment (not shown) may transmit the normal waveform 220-a and/or the flexible bandwidth waveform 210-a.

Figure 2B:
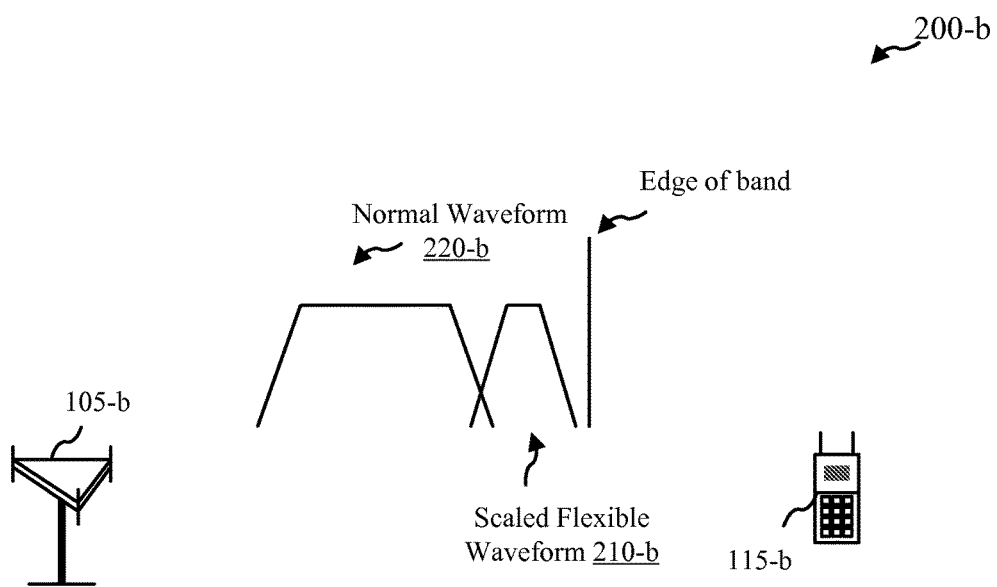
FIG. 2B shows an example of a wireless communications system where a flexible bandwidth waveform fits into a portion of spectrum near an edge of a band in accordance with various embodiments.

FIG. 2B shows an example of a wireless communications system 200-b with a base station 105-b and user equipment 115-b, where a flexible bandwidth waveform 210-b fits into a portion of spectrum near an edge of a band, which may be a guard band, where normal waveform 220-b may not fit. System 200-b may be an example of system 100 of FIG. 1. User equipment 115-a/115-b and/or base stations 105-a/105-b may be configured to dynamically adjust the bandwidth of the flexible bandwidth waveforms 210-a/210-b in accordance with various embodiments.

In some embodiments, different aspects of systems 200-a and/or 200-b, such as the user equipment 115-a and/or 115-b and/or the base stations 105-a and/or 105-b may be configured to identify timing for one or more subframes that carry one or more feedback messages, for example, ACK/NACK messages, for a first cell. Different aspects of systems 200-a and/or 200-b, such as the user equipment 115-a and/or 115-b and/or the base stations 105-a and/or 105-b may be configured to adjust a timing for one or more subframes that carry one or more feedback messages for a second cell to align with the one or more subframes that carry the one or more feedback messages for the first cell. At least the first cell or the second cell may include at least one of the one or more flexible bandwidth carriers.

In general, a first waveform or carrier bandwidth and a second waveform or carrier bandwidth may partially overlap when they overlap by at least 1%, 2%, and/or 5%. In some embodiments, partial overlap may occur when the overlap is at least 10%. In some embodiments, the partial overlap may be less than 99%, 98%, and/or 95%. In some embodiments, the overlap may be less than 90%. In some cases, a flexible bandwidth waveform or carrier bandwidth may be contained completely within another waveform or carrier bandwidth. This overlap may still reflect partial overlap, as the two waveforms or carrier bandwidths do not completely coincide. In general, partial overlap can mean that the two or more waveforms or carrier bandwidths do not completely coincide (i.e., the carrier bandwidths are not the same).

Some embodiments may utilize different definitions of overlap based on power spectrum density (PSD). For example, one definition of overlap based on PSD is shown in the following overlap equation for a first carrier:

$$\text{overlap} = 100\% \frac{\int_0^\infty PSD_1(f) * PSD_2(f)}{\int_0^\infty PSD_1(f) * PSD_1(f)}.$$

In this equation, $PSD_1(f)$ is the PSD for a first waveform or carrier bandwidth and $PSD_2(f)$ is the PSD for a second waveform or carrier bandwidth. When the two waveforms or carrier bandwidths coincide, then the overlap equation may equal 100%. When the first waveform or carrier bandwidth and the second waveform or carrier bandwidth at least partially overlap, then the overlap equation may not equal 100%. For example, the Overlap Equation may result in a partial overlap of greater than or equal to 1%, 2%, 5%, and/or 10% in some embodiments. The overlap equation may result in a partial overlap of less than or equal to 99%, 98%, 95%, and/or 90% in some embodiments. One may note that in the case in which the first waveform or carrier bandwidth is a normal waveform or carrier bandwidth and the second waveform or a carrier waveform is a flexible bandwidth waveform or carrier bandwidth that is contained within the normal bandwidth or carrier bandwidth, then the overlap equation may represent the ratio of the flexible bandwidth compared to the normal bandwidth, written as a percentage. Furthermore, the overlap equation may depend on which carrier bandwidth's perspective the overlap equation is formulated with respect to. Some embodiments may utilize other definitions of overlap. In some cases, another overlap may be defined utilizing a square root operation such as the following:

$$\text{overlap} = 100\% \sqrt{\frac{\int_0^\infty PSD_1(f) * PSD_2(f)}{\int_0^\infty PSD_1(f) * PSD_1(f)}}.$$

Other embodiments may utilize other overlap equations that may account for multiple overlapping carriers.

Figure 3:
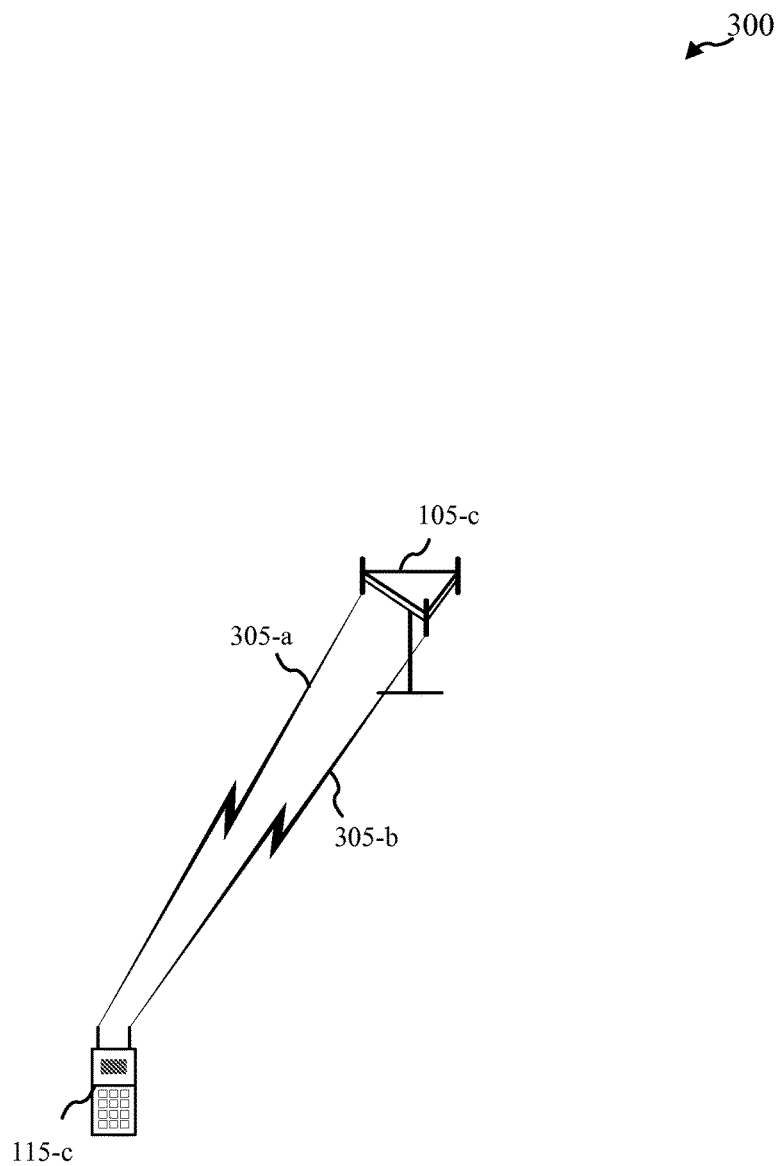
FIG. 3 shows a block diagram of a wireless communications system in accordance with various embodiments.

FIG. 3 shows a wireless communications system 300 with a base station 105-*c* and user equipment 115-*c* in accordance with various embodiments. Different aspects of system 300, such as the user equipment 115-*c* and/or the base stations 105-*c*, may be configured for signaling alignment in system 300 that may utilize multiple carriers including one or more flexible bandwidth carriers.

Transmissions 305-*a* and/or 305-*b* between the user equipment 115-*c* and the base station 105-*a* may utilize normal and/or flexible bandwidth waveforms that may be generated to occupy less (or more) bandwidth than a normal waveform. For example, at a band edge, there may not be enough available spectrum to place a normal waveform. For a flexible bandwidth waveform, as time gets dilated, the frequency occupied by a waveform goes down, thus making it possible to fit a flexible bandwidth waveform into spectrum that may not be broad enough to fit a normal waveform. In some embodiments, the flexible bandwidth waveform may be scaled utilizing a scaling factor N with respect to a normal waveform. Scaling factor N may take on numerous different values including, but not limited to, integer values such as 1, 2, 3, 4, 8, etc. N, however, does not have to be an integer. In some cases, transmissions 305-*a* may be with respect to a primary serving cell and transmission 305-*b* may be with respect to a secondary serving cell.

Different aspects of system 300, such as the user equipment 115-*c* and/or the base stations 105-*c*, may be configured for identifying timing for one or more subframes that carry one or more feedback messages, for example ACK/NACK messages, for a first cell, such as a primary serving cell. The user equipment 115-*c* and/or the base stations 105-*c* may adjust a timing for one or more subframes that carry one or more feedback messages for a second cell, which may be a secondary serving cell, to align with the one or more subframes that carry the one or more feedback messages for the first cell. At least the first cell or the second cell may include at least one of the one or more flexible or scalable bandwidth carriers.

In some embodiments, adjusting the timing for the one or more subframes for the second cell reduces a delay for the one or more feedback messages for the second cell relative to a standalone carrier cell. In some embodiments, adjusting the timing for the one or more subframes for the second cell includes and/or may require an increase in a capacity of a resource used for the one or more feedback messages for both the first cell and the second cell when a bandwidth of the second cell is greater than a flexible bandwidth of the first cell. In some embodiments, adjusting the timing for the one or more subframes for the second cell may include and/or may require a decrease in a capacity of a resource used for the one or more feedback messages for both the first cell and second cell when a flexible or scalable bandwidth of the second cell is less than a bandwidth of the first cell.

In some embodiments, transmission 305-*a* may include a normal bandwidth carrier and transmission 305-*b* may include one of the one or more flexible or scalable bandwidth carriers. In some embodiments, the transmission 305-*a* may include a flexible bandwidth carrier and the transmission 305-*b* may include one of the one or more flexible bandwidth carriers different from the first cell.

In some embodiments, transmission 305-*a* includes one of the one or more flexible bandwidth carriers and transmission 305-*b* includes a normal bandwidth carrier. In some embodiments, transmission 305-*a* includes one of the one or more flexible bandwidth carriers and transmission 305-*b* includes one of the one or more flexible bandwidth carriers different from the first cell.

In some embodiments, transmission 305-*a* includes a bandwidth scaling factor equal to 1 and transmission 305-*b* includes a bandwidth scaling factor equal to 2 or 4. In other embodiments, transmission 305-*a* includes a bandwidth scaling factor equal to 2 or 4 and the transmission 305-*b* includes a bandwidth scaling factor equal to 1.

For example, system 300 may be an example of a multicarrier High Speed Downlink Packet Access (HSDPA) network that may utilize a primary serving High Speed Downlink Shared Channel (HS-DSCH cell) with a normal chip rate, such as 3.84 Mcps (e.g., N=1) and a secondary serving HS-DSCH cell(s) that may utilize a time dilated chip rate=3.84/2 Mcps (e.g., N=2) or 3.84/4 Mcps (e.g., N=4) or vice versa. The methods and systems described herein may accommodate the fact that only the primary serving HS-DSCH cell may transmit feedback messages on the uplink for all carriers via a High Speed Dedicated Physical Control Channel (HS-DPCCH) of the primary serving cell in order to ensure proper signaling alignment.

Some embodiments may utilize additional terminology. A new unit D may be utilized. The unit D is dilated. The unit is unitless and has the value of N. One can talk about time in the flexible system in terms of "dilated time". For example, a slot of say 10 ms in normal time may be represented as 10 Dms in flexible time (note: even in normal time, this will hold true since N=1 in normal time: D has a value of 1, so 10 Dms=10 ms). In time scaling, one can replace most "seconds" with "dilated-seconds". Note frequency in Hertz is 1/s.

As discussed above, a flexible bandwidth or scalable bandwidth waveform may be a waveform that occupies less bandwidth than a normal waveform. Thus, in a flexible bandwidth system, the same number of symbols and bits may be transmitted over a longer duration compared to normal bandwidth system. This may result in time stretching, whereby slot duration, frame duration, etc., may increase by a scaling factor N. Scaling factor N may represent the ratio of the normal bandwidth to flexible bandwidth (BW). Thus, data rate in a flexible bandwidth system may equal (Normal Rate×1/N), and delay may equal (Normal Delay×N). In general, a flexible systems channel BW=channel BW of normal systems/N. Delay×BW may remain unchanged. Furthermore, in some embodiments, a flexible bandwidth waveform may be a waveform that occupies more bandwidth than a normal waveform. Scaling factor N may also be referred to as a bandwidth scaling factor.

Throughout this specification, the term normal system, subsystem, and/or waveform may be utilized to refer to systems, subsystems, and/or waveforms that involve embodiments that may utilize a scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a scaling factor that may be not equal to one (e.g., N=2, 4, 8, ½, ¼, etc.). For N>1, or if a chip rate is decreased, the bandwidth of a waveform may decrease. Some embodiments may utilize scaling factors or chip rates that increase the bandwidth. For example, if N<1, or if the chip rate is increased, then a waveform may be expanded to cover bandwidth larger than a normal waveform. Some embodiments may utilize a chip rate divisor (Dcr) to change the chip rate in some embodiments. Flexible systems, subsystems, and/or waveforms may also be referred to as scalable systems, subsystems, and/or waveforms in some cases. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system). Furthermore, the use of the term flexible may also be utilized to mean flexible bandwidth capable.

Turning next to FIGS. 4A-4F, frame timing diagrams illustrates multiple configurations 400, 400-a, 400-b, 400-c, 400-d, and 400-e (collectively referred to as configurations 400) that include signaling alignment functionality in a multicarrier system that utilizes one or more flexible bandwidth carriers in accordance with various embodiments. The configurations 400 may be examples of signaling alignment implemented by various wireless entities, including all or part of: the base stations 105 of FIG. 1, FIG. 2A, FIG. 2B, and FIG. 3; the user equipment 115 of FIG. 1, FIG. 2A, FIG. 2B, FIG. 3; and/or the controller 120/core network 130 of FIG. 1. The common aspects between FIGS. 4A-4F will be described generally, and the particulars of each FIG. will then be described separately.

In some embodiments, configurations 400 may be implemented in a wireless communication system utilizing High-Speed Downlink Packet Access (HSDPA). A primary serving cell 405, such as a High-Speed Downlink Shared Channel (HS-DSCH), may have a scaling factor of N=1. A secondary serving cell 415, which may also be a HS-DSCH cell, may have a scaling factor of N=2 or N=4. Conversely, in some embodiments, the primary serving cell 405 may have a scaling factor of N=2 or N=4, and the secondary serving cell 415 may have a scaling factor of N=1.

In some embodiments, the primary serving cell 405 may include multiple channels, such as a Primary Common Pilot Channel (P-CPICH) 406, a Primary Common Control Physical Channel (P-CCPCH) 407, a Dedicated Physical Channel (DPCH) 408, an Uplink Dedicated Control Channel/Dedicated Physical Data Channel (UL-DPCCH/DPDCH) 409, a High Speed-Shared Control Channel (HS-SCCH) 411, a High Speed-Physical Downlink Shared Channel (HS-PDSCH) 412, and/or an Uplink High Speed-Dedicated Physical Control Channel (HS-DPCCH$_1$) 413. The HS-DPCCH$_1$ 413 may carry feedback information, including feedback messages such as ACK/NACK messages for the primary serving cell 405 and/or for the secondary serving cell 415. In some embodiments, the HS-DPCCH$_1$ 413 may carry feedback information for the HS-PDSCH 412 and/or for a HS-PDSCH 418 associated with the secondary cell 415. Some of these channels may be represented via subframes. For example, HS-SCCH 411, HS-PDSCH 412, and HS-DPCCH$_1$ 413 may each transmit #0 through #4 subframes, etc. Depending on the configuration, the timing relationships of these different channels may vary, as will be described below.

In some embodiments, the secondary serving cell 415 may also include multiple channels, such as a P-CPICH 416, a HS-SCCH 417, and/or a HS-PDSCH 418. The secondary cell may also include a HS-DPCCH$_2$ 419 that may be used to carry feedback information for the secondary serving cell 415, such as for HS-PDSCH 418. In some embodiments, the feedback messaging for the secondary serving cell 415 is conveyed to the primary serving cell 405 for transmission, but can be delayed due to time scaling differences between the cells. In some embodiments, feedback information for HS-PDSCH 418 may be sent on the HS-DPCCH$_1$ 413. Some of these channels may be represented via subframes. For example, HS-SCCH 417, HS-PDSCH 418, and HS-DPCCH$_2$ 419 may each have #0 through #4 subframes, etc. Depending on the configuration, the timing relationships of these different channels may vary, as will be described below.

In some embodiments, different radio frames may be transmitted over P-CCPCH 407, for example a first radio frame 420, e.g. SFN modulo 2, equal to 0, and a second radio frame 425, e.g. SFN modulo 2, equal to 1. A frame over an nth DPCH 408 may start transmitting after a starting time delay τDPCH,n, in relation to the P-CCPCH 407 and the P-CPICH 406. A frame on the UL-DPCCH/DPDCH 409 may start a time To 430 after the nth DPCH 408 subframe starts transmitting. In some embodiments, a subframe on the HS-PDSCH 412 may start transmitting a time 435 after a subframe on the HS-SCCH 411.

In some embodiments, a subframe on the HS-DPCCH$_1$ 413 may be transmitted a time 440 after a subframe on the HS-PDSCH 412. In some cases, this delay may be measured relative to the start time of a #1 subframe.

In some embodiments, a subframe on the HS-PDSCH 418 may be transmitted a time 445 after a subframe on the HS-SCCH 417. In some cases, this delay may be measured relative to the start time of a #0 subframe.

In some embodiments, because the primary serving cell 405 and the secondary serving cell 415 having different scaling factors, the starting times of the respective subframes on various channels may be misaligned. For example, the starting times of subframes on the HS-PDSCH 412 of the primary serving cell 405 may be offset from the starting times of subframes on the HS-PDSCH 418 of the secondary serving cell 415. This may cause feedback messaging on the secondary serving cell 415 HS-DPCCH$_2$ 419 to be offset by an offset 450 from feedback messaging on the primary serving cell 405 HS-DPCCH$_1$ 413. In some embodiments, the feedback messaging that would normally be sent over HS-DPCCH$_2$ 419 may be sent over HS-DPCCH$_1$ 413, as the secondary serving cell 415 may not have an HS-DPCCH. In FIGS. 4A-4F, HS-DPCCH$_1$ 413 is mapped adjacent to HS-DPCCH$_2$ 419 to more aptly show the time offset 450, which is a result of the time dilation of at least one of the primary and secondary serving cells 405 and 415 causing the delay time 440 between the beginning of subframe #1 of the HS-PDSCH 412 and the beginning of subframe 0 of the HS-DPCCH$_1$ 413 to differ from a delay time 455 between the beginning of subframe #1 of the HS-PDSCH 418 and the beginning of subframe 0 of the HS-DPCCH$_2$ 419.

Figure 4A:
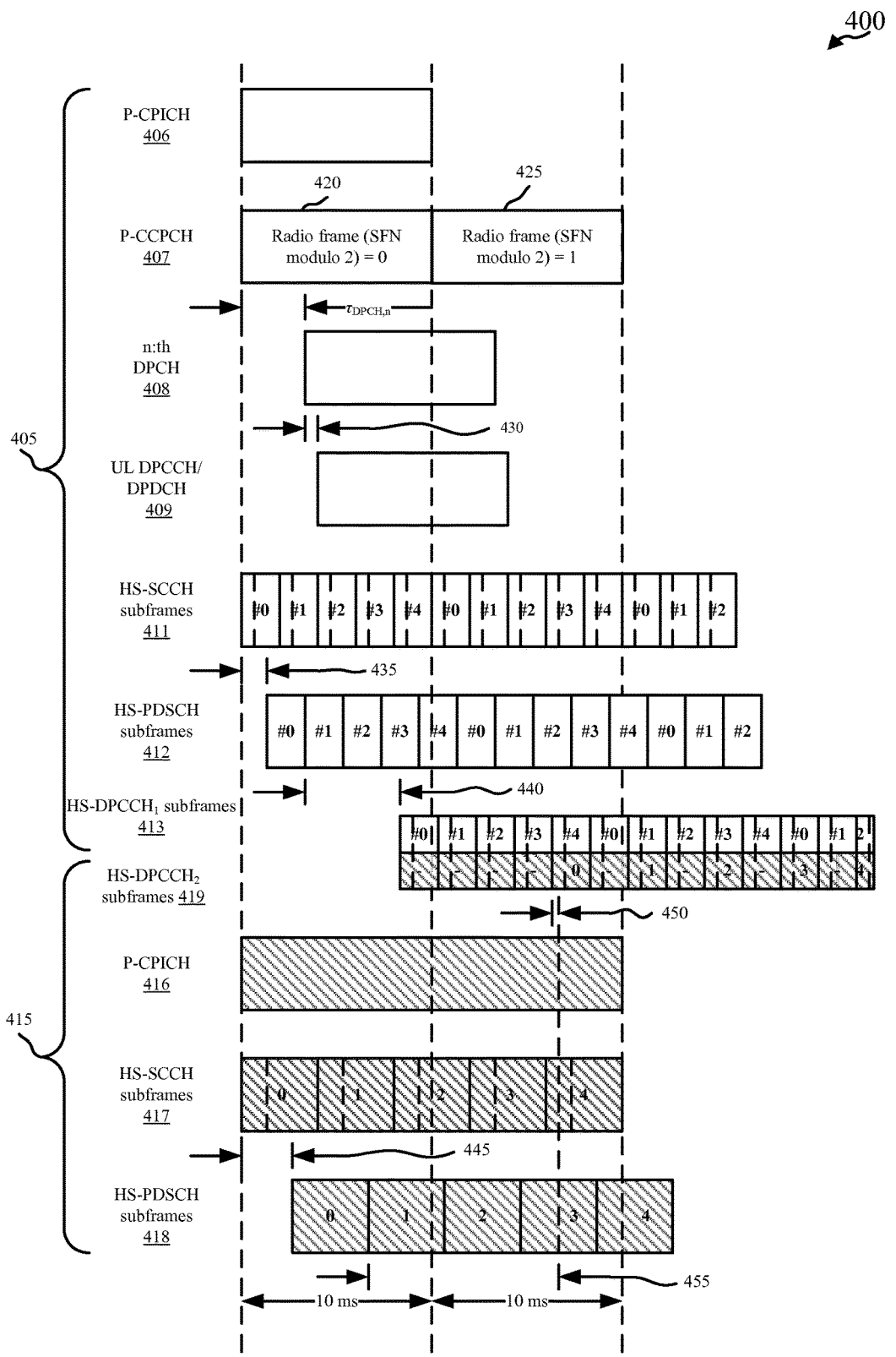
FIG. 4A shows a frame timing diagram of two channels having different scaling factors in accordance with various embodiments.

In particular, FIG. 4A shows a configuration 400, where for the primary serving cell 405, N=1, and for the secondary serving cell 415, N=2. For the primary serving cell 405, the start delay 430 for the start of a frame on the UL DPCCH/DPDCH 409 after a start time of a frame of an nth DPCH 408 may equal 1024 chips or 266.67 μs. A subframe on the HS-PDSCH 412 may start transmitting a time 435 after a subframe on the HS-SCCH 411, for example 2 slots, which may be equivalent to 1.33 ms. In some embodiments, a subframe on the HS-DPCCH 413 may be transmitted after a subframe on the HS-PDSCH 412. In some cases, this delay 440 may be measured relative to the start time of a #1 subframe and may be in the range of 7.5 slots plus 0 to 255 chips, or for N=1, 5.0 ms plus 0 to 66.4 μs. A subframe on the HS-PDSCH 418 may be transmitted after a subframe on the HS-SCCH 417. In some cases, this delay 445 may be measured relative to the start time of a #0 subframe and may be equal to 2 dilated slots, or for an N=2 cell, 2.67 ms.

In some embodiments, time 455 for the secondary serving cell 415 may be 7.5 dilated slots+(0 to 255) dilated chips, or 10.0 ms+(0 to 132.8) μs. As this is different from a corresponding time 440 for the primary serving cell between the beginning of subframe #1 of the HS-PDSCH 412 and the beginning of subframe 0 of the HS-DPCCH1 413, a delay 450 between HS-DPCCH1 413 and the potential HS-DPCCH2 419 may exist. For example, delay 450 may equal 0.5 slots or 0.33 ms. By identifying and taking into account this offset between the primary and secondary serving cells 405 and 415, and adjusting a start time for the secondary serving cell 415 based on the offset 450, the feedback signaling of the primary and secondary serving cells 405 and 415 may be aligned. For example, in some cases, this may include starting the transmission of feedback for the secondary serving cell 415 0.33 ms earlier than would otherwise be the case, i.e. eliminating the delay 450 between the primary and secondary serving cells 405 and 415.

In some embodiments, the maximum number of secondary serving N=2 HS-DSCH cells 415 with one N=1 HS-DPCCH$_1$ 413 is 3, for example if 4 ACK/NACKs are configured on the HS-DPCCH$_1$ 413.

Figure 4B:
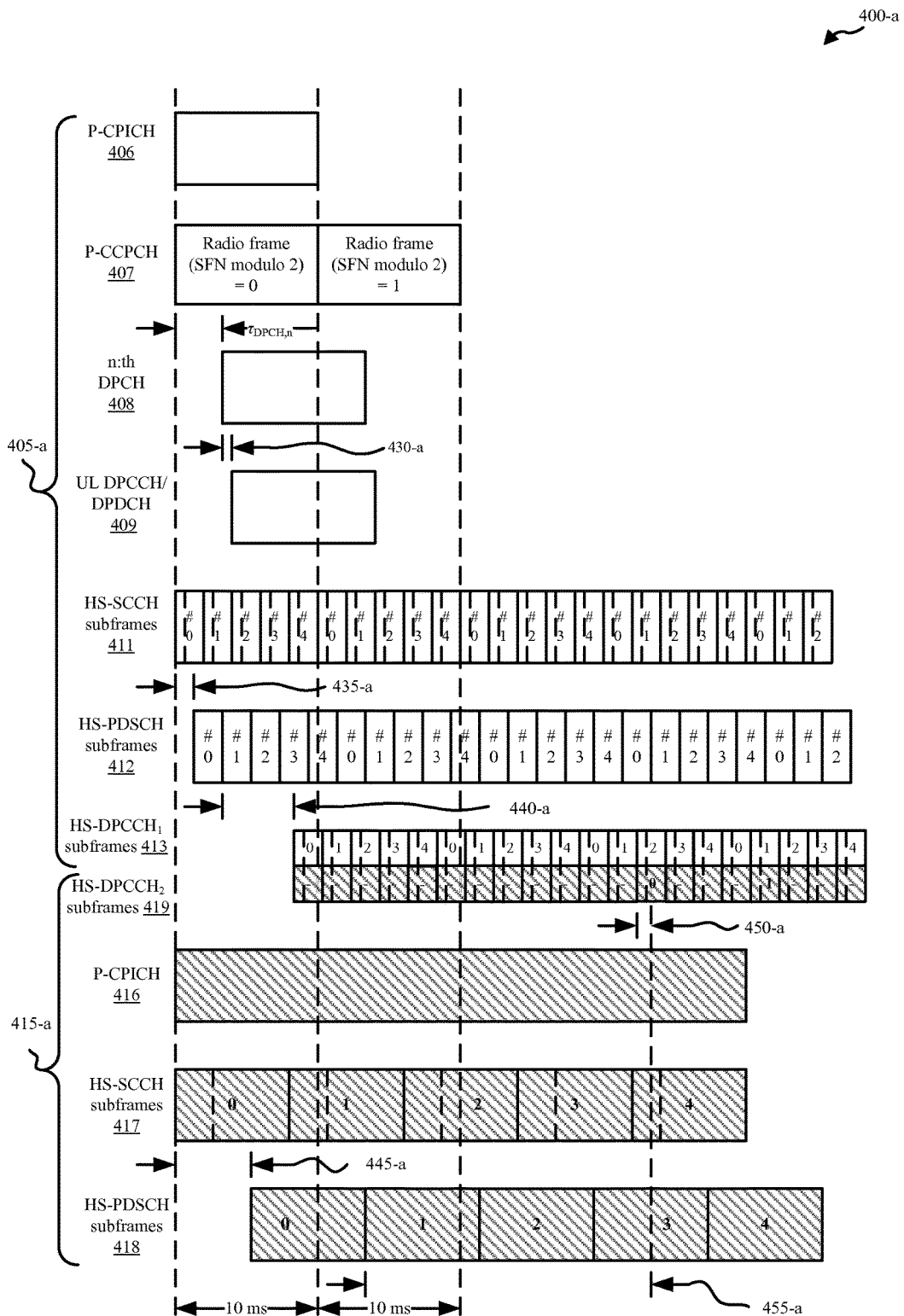
FIG. 4B shows a frame timing diagram of two channels having different scaling factors in accordance with various embodiments.

Turning next to FIG. 4B, a timing diagram illustrates a configuration 400-*a*, where for the primary serving cell 405-*a*, N=1, and for the secondary serving cell 415-*a*, N=4. For the primary serving cell 405-*a*, the start delay 430-*a* for the start of a frame on the UL DPCCH/DPDCH 409 after a start time of a frame of an nth DPCH 408 may equal 1024 chips or 266.67 μs. A subframe on the HS-PDSCH 412 may start transmitting a time 435-*a* after a subframe on the HS-SCCH 411, for example 2 slots, which may be equivalent to 1.33 ms. In some embodiments, a subframe on the HS-DPCCH 413 may be transmitted after a subframe on the HS-PDSCH 412. In some cases, this delay 440-*a* may be measured relative to the start time of a subframe 1 and may be in the range of 7.5 slots plus 0 to 255 chips, or for N=1, 5.0 ms plus 0 to 66.4 μs. A subframe on the HS-SCCH 417 may be transmitted after a subframe on the HS-PDSCH 418. In some cases, this delay 445-*a* may be measured relative to the start time of a subframe 0 and may be equal to 2 dilated slots, or for an N=2 cell, 5.33 ms.

In some embodiments, a time 455-*a* for the secondary serving cell 415-*a* may be 7.5 dilated slots+(0 to 255) dilated chips, or 20.0 ms+(0 to 265.6) μs. As this is different from a corresponding time 440-*a* for the primary serving cell 405-*a* between the beginning of subframe 1 of the HS-PDSCH 412 and the beginning of subframe 0 of the HS-DPCCH1 413, a delay 450-*a* between HS-DPCCH1 413 and the potential HS-DPCCH2 419 may exist. For example, delay 450-*a* may equal 1.5 slots or 1.0 ms. By taking into account this offset between the primary and secondary serving cells 405-*a* and 415-*a*, and adjusting a start time for the secondary serving cell 415-*a* based on the offset 450-*a*, the feedback signaling of the primary and secondary serving cells 405-*a* and 415-*a* may be aligned. For example, in some cases, this may include starting the transmission of feedback for the secondary serving cell 415-*a* 1.0 ms earlier than would otherwise be the case, i.e. eliminating the delay 450 between the primary and secondary serving cells 405 and 415.

In some embodiments, the maximum number of secondary serving N=4 HS-DSCH cells 415-*a* with one N=1 HS-DPCCH$_1$ 413 is 3, for example if 4 ACK/NACKs are configured on the HS-DPCCH$_1$ 413.

Figure 4C:
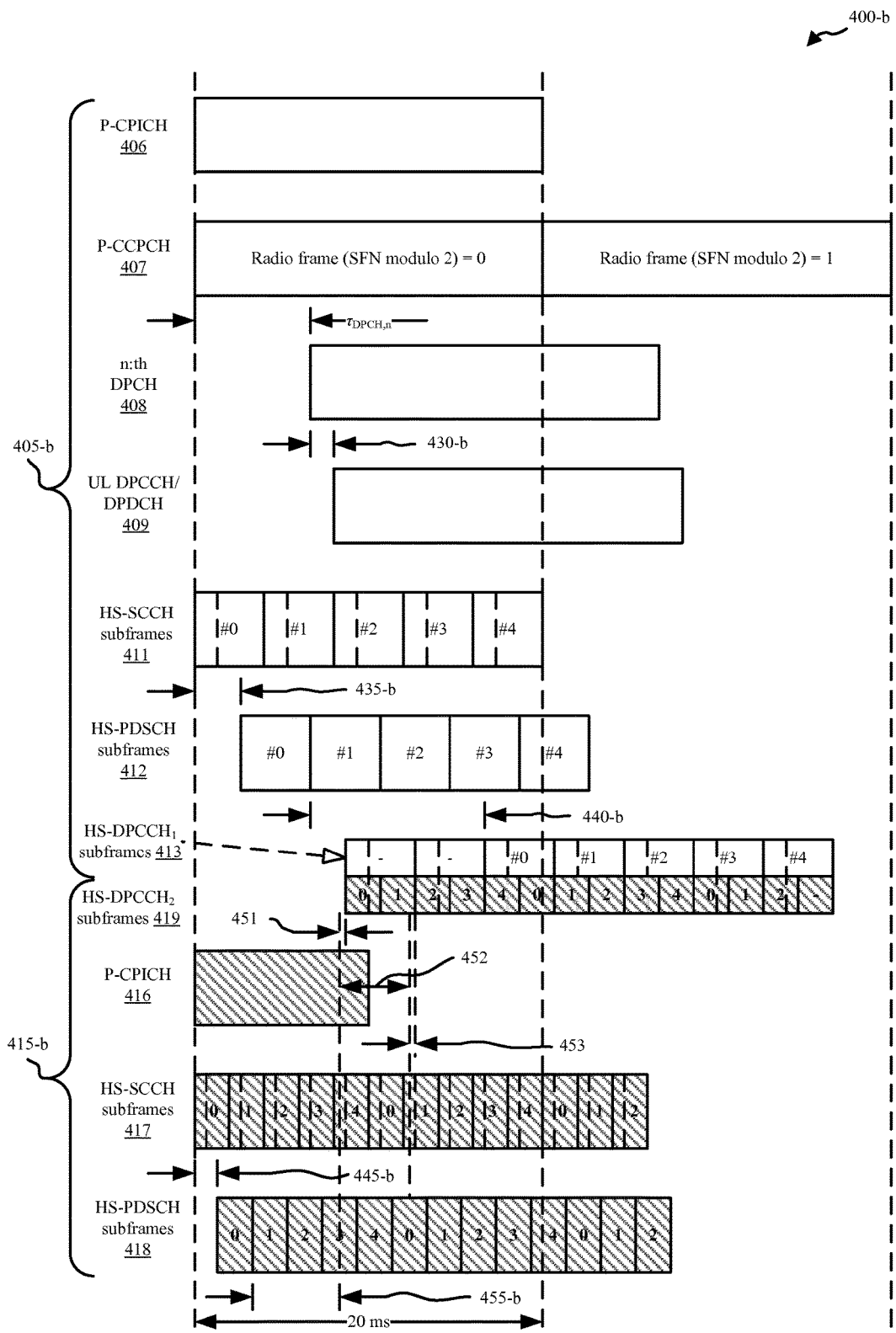
FIG. 4C shows a frame timing diagram of two channels having different scaling factors in accordance with various embodiments.

Turning next to FIG. 4C, a timing diagram illustrates a configuration 400-*b*, where for the primary serving cell 405-*b*, N=2, and for the secondary serving cell 415-*b*, N=1. For the primary serving cell 405-*b*, the start delay 430-*b* for the start of a frame on the UL DPCCH/DPDCH 409 after a start time of a frame of an nth DPCH 408 may equal 1024 dilated chips, or 533.33 μs. A subframe on the HS-PDSCH 412 may start transmitting a time 435-*b* after a subframe on the HS-SCCH 411, for example 2 dilated slots, which may be equivalent to 2.67 ms. In some embodiments, a subframe on the HS-DPCCH 413 may be transmitted after a subframe on the HS-PDSCH 412. In some cases, this delay 440-*b* may be measured relative to the start time of a subframe 1 and may be in the range of 7.5 dilated slots+(0 to 255) dilated chips, or 10.0 ms+(0 to 132.8) μs. A subframe on the HS-PDSCH 418 may be transmitted after a subframe on the HS-SCCH 417. In some cases, this delay 445-*b* may be measured relative to the start time of a subframe 0 and may be equal to 2 slots, or for an N=1 cell, 1.33 ms.

In some embodiments, a time 455-*b* for the secondary serving cell 415-*b*, which may represent a time between the end of a transmission time for subframe 0 on the HS-PDSCH 418 and the start of subframe 0 on the potential HS-DPCCH$_2$ 419 that may carry feedback information, may be 7.5 slots+(0 to 255) chips, or 5.0 ms+(0 to 66.4) μs. As this is different from a corresponding time 440-*b* for the primary serving cell 405-*b* between the beginning of subframe 1 of the HS-PDSCH 412 and the beginning of subframe 0 of the HS-DPCCH$_1$ 413, misalignment between HS-DPCCH$_1$ 413 and the potential HS-DPCCH$_2$ 419 may exist. For example, a time 451 may exist between an end of time 455-*b* and the start of subframe 0 on HS-DPCCH$_2$ 419. This time 451 may be equal to 0.5 slots, or 0.33 ms. In some cases, a time 452, which may represent the time it would have taken to send ACK/NACKs for subframes 0 and 1 for secondary serving cell 415-*b* if the secondary serving cell 415-*b* had an HS-DPCCH, such as HS-DPCCH$_2$ 419, may be 451 equal to 6 slots, or 4.0 ms. In some cases time 452 may account for a delay 453 between a subframe of the HS-DPCCH$_1$ 413 and two subframes of the potential HS-DPCCH$_2$ 419, which may be equal to 0.5 slots, or 0.33 ms.

In some cases, by taking into account the misalignment between the primary and serving cells 405-*b* and 415-*b*, and adjusting a start time for the secondary serving cell 415-*b* based on the delay 453, the feedback signaling of the primary and secondary serving cells 405-*b* and 415-*b* may be aligned. For example, after identifying the timing relationship between the primary and secondary serving cells 405-*b* and 415-*b*, a subframe 0 on HS-DPCCH$_1$ 413 carrying feedback messages for the subframe 0 of the HS-PDSCH 418 may be transmitted 8 slots, or 5.33 ms, after transmission of the subframe 0 of the HS-PDSCH 418, or 7.5 slots (5.0 ms) after transmission of the subframe 0 of the HS-PDSCH 418. If the secondary serving cell 415-*b* has an actual HS-DPCCH, which may be HS-DPCCH$_2$ 419. In some cases, this may result in adding a feedback delay for the secondary serving cell 415-*b* of 3.5 slots, or 2.33 ms for the first subframe (0) and a delay of 0.5 slots, or 0.33 ms, for a second subframe (1), when feedback messages, e.g. ACK/NACK messages are grouped into 2 messages per bundle In some embodiments, the maximum number of secondary serving N=1 HS-DSCH cells 415-*b* with one N=2 HS-DPCCH$_1$ 413 is 1, for example if 3 or 4 ACK/NACKs are configured on the HS-DPCH$_1$ 413.

Figure 4D:
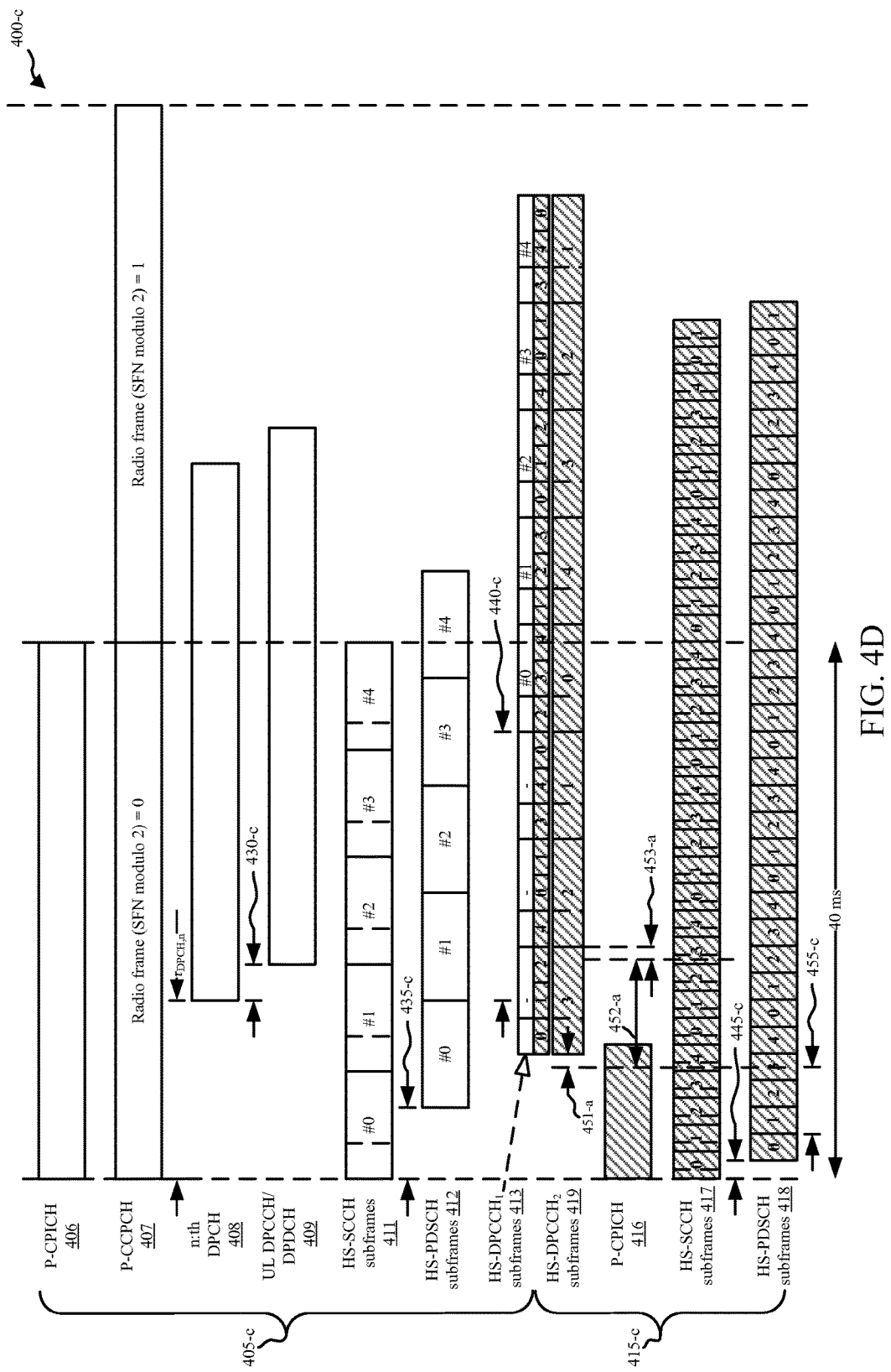
FIG. 4D shows a frame timing diagram of two channels having different scaling factors in accordance with various embodiments.

Turning next to FIG. 4D, a timing diagram illustrates a configuration 400-*c*, where for the primary serving cell 405-*c*, N=4, and for the secondary serving cell 415-*c*, N=1. For the primary serving cell 405-*c*, the start delay 430-*c* for the start of a frame on the UL DPCCH/DPDCH 409 after a start time of a frame of an nth DPCH 408 may equal 1024 dilated chips, or 1066.67 µs. A subframe on the HS-PDSCH 412 may start transmitting a time 435-*c* after a subframe on the HS-SCCH 411, for example 2 dilated slots, which may be equivalent to 5.33 ms. In some embodiments, a subframe on the HS-DPCCH 413 may be transmitted after a subframe on the HS-PDSCH 412. In some cases, this delay 440-*c* may be measured relative to the start time of a subframe 1 and may be in the range of 7.5 dilated slots+(0 to 255) dilated chips, or 20.0 ms+(0 to 265.6) µs. A subframe on the HS-PDSCH 418 may be transmitted after a subframe on the HS-SCCH 417. In some cases, this delay 445-*c* may be measured relative to the start time of a subframe 0 and may be equal to 2 slots, or for an N=1 cell, 1.33 ms.

In some embodiments, a time 455-*c* for the secondary serving cell 415-*c*, which may represent a time between the end of a transmission time for subframe 0 on the HS-PDSCH 418 and the start of subframe 0 on the potential HS-DPCCH$_2$ 419 that may carry feedback information, may be 7.5 slots+(0 to 255) chips, or 5.0 ms+(0 to 66.4) µs. As this is different from a corresponding time 440-*c* for the primary serving cell 405-*c* between the beginning of subframe 1 of the HS-PDSCH 412 and the beginning of subframe 0 of the HS-DPCCH$_1$ 413, misalignment between HS-DPCCH$_1$ 413 and the potential HS-DPCCH$_2$ 419 may exist. For example, a time 451-*a* may exist between an end of time 455-*c* and the start of subframe 0 on HS-DPCCH$_2$ 419. This time 451-*a* may be equal to 1.5 slots, or 1.0 ms. In some cases, a time 452-*a*, which may represent the time it would have taken to send ACK/NACKs for subframes 0, 1, 2, and 3 for secondary serving cell 415-*c* if the secondary serving cell 415-*c* had an HS-DPCCH, such as HS-DPCCH$_2$ 419, may be equal to 12 slots, or 8.0 ms. In some cases time 452-*a* may account for a delay 453-*a* between a subframe of the HS-DPCCH$_1$ 413 and four subframes of the potential HS-DPCCH$_2$ 419, which may be equal to 1.5 slots, or 1.0 ms.

In some cases, by taking into account the misalignment between the primary and serving cells 405-*c* and 415-*c*, and adjusting a start time for the secondary serving cell 415-*c* based on the delay 453-*a*, the feedback signaling of the primary and secondary serving cells 405-*c* and 415-*c* may be aligned. For example, after identifying the timing relationship between the primary and secondary serving cells 405-*c* and 415-*c*, a subframe 0 on HS-DPCCH$_1$ 413 carrying feedback messages for the subframe 0 of the HS-PDSCH 418 may be transmitted 9 slots, or 6.0 ms, after transmission of the subframe 0 of the HS-PDSCH 418, or 7.5 slots (5.0 ms) after transmission of the subframe 0 of the HS-PDSCH 418 if the secondary serving cell 415-*c* has an actual HS-DPCCH, which may be HS-DPCCH$_2$ 419. In some cases, this may result in adding a feedback delay for the secondary serving cell 415-*c* by 10.5 slots, or 7.0 ms for the first subframe (0), a delay of 7.5 slots, or 5.0 ms for a second subframe (1), a delay of 4.5 slots, or 3.0 ms for a third subframe (2), and/or a delay of 1.5 slots, or 1.0 ms for a fourth subframe (3), when feedback messages, e.g. ACK/NACK messages are grouped into 4 messages per bundle.

In some embodiments, the maximum number of secondary serving N=1 HS-DSCH cells 415-*c* with two N=4 HS-DPCCH$_1$ 413 is 2, for example if 4 ACK/NACKs are configured on the HS-DPCCH$_2$ 419.

Figure 4E:
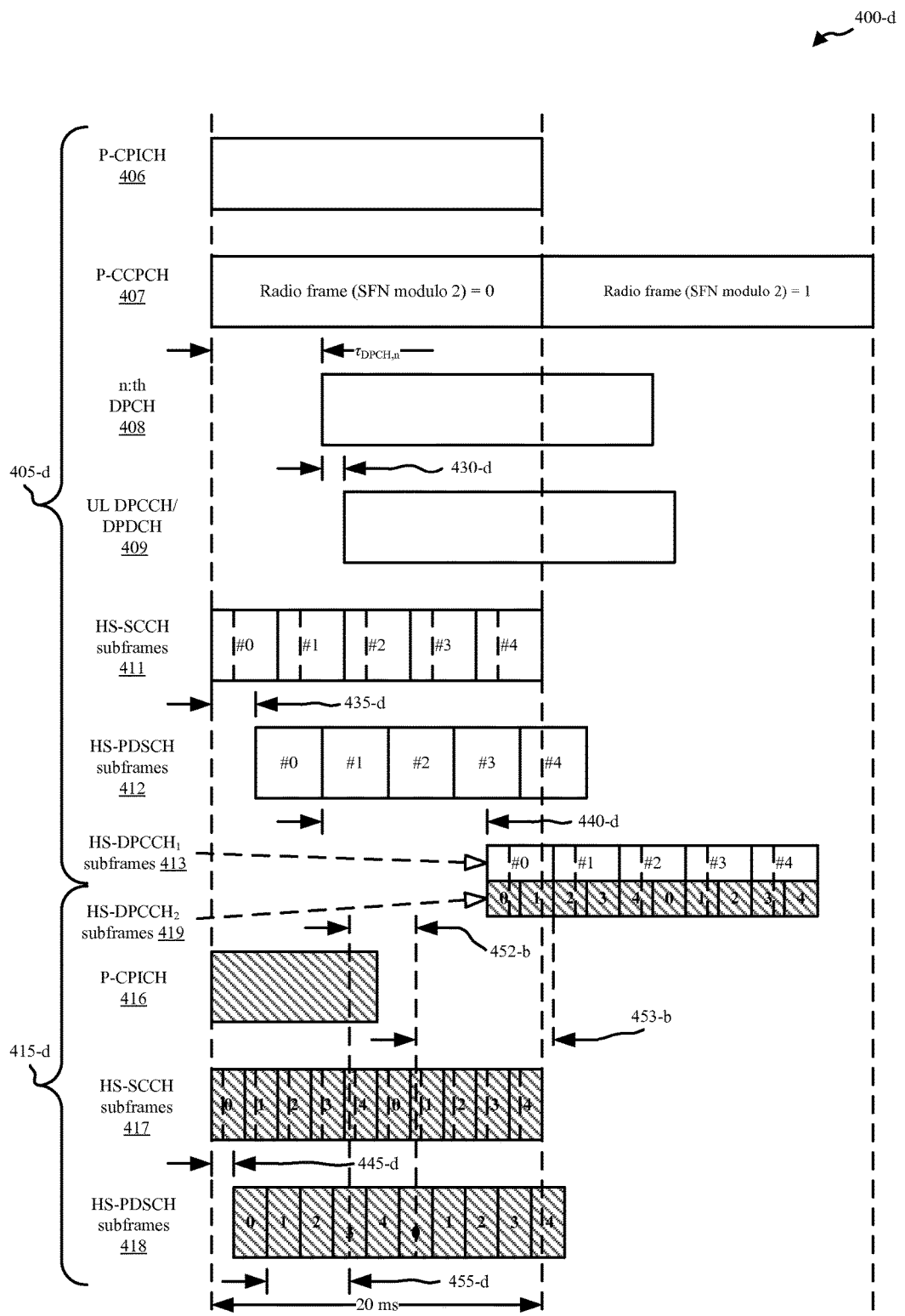
FIG. 4E shows a frame timing diagram of two channels having different scaling factors in accordance with various embodiments.

Turning next to FIG. 4E, a timing diagram illustrates a configuration 400-*d*, which may be similar to configuration 400-*b*, without a timing advance for the HS-PDCCH, where for the primary serving cell 405-*d*, N=2, and for the secondary serving cell 415-*d*, N=1. For the primary serving cell 405-*d*, the start delay 430-*d* for the start of a frame on the UL DPCCH/DPDCH 409 after a start time of a frame of an nth DPCH 408 may equal 1024 dilated chips, or 533.33 µs. A subframe on the HS-PDSCH 412 may start transmitting a time 435-*d* after a subframe on the HS-SCCH 411, for example 2 dilated slots, which may be equivalent to 2.67 ms. In some embodiments, a subframe on the HS-DPCCH 413 may be transmitted after a subframe on the HS-PDSCH 412. In some cases, this delay 440-*d* may be measured relative to the start time of a subframe 1 and may be in the range of 7.5 dilated slots+(0 to 255) dilated chips, or 10.0 ms+(0 to 132.8) µs. A subframe on the HS-PDSCH 418 may be transmitted after a subframe on the HS-SCCH 417. In some cases, this delay 445-*d* may be measured relative to the start time of a subframe 0 and may be equal to 2 slots, or for an N=1 cell, 1.33 ms.

In some embodiments, a time 455-*d* for the secondary serving cell 415-*d*, which may represent a time between the end of a transmission time for subframe 0 on the HS-PDSCH 418 and the start of subframe 0 on the potential HS-DPCCH$_2$ 419 that may carry feedback information, may be 7.5 slots+(0 to 255) chips, or 5.0 ms+(0 to 66.4) µs. As this is different from a corresponding time 440-*d* for the primary serving cell 405-*d* between the beginning of subframe 1 of the HS-PDSCH 412 and the beginning of subframe 0 of the HS-DPCCH$_1$ 413, misalignment between HS-DPCCH$_1$ 413 and the potential HS-DPCCH$_2$ 419 may exist. For example, a time 452-*b* may represent the time it would have taken to send ACK/NACKs for subframes 0 and 1 for secondary serving cell 415-*d* if the secondary serving cell 415-*d* had an HS-DPCCH, which may be represented by HS-DPCCH$_2$ 419. Time 452-*b* may be equal to 6 slots, or 4.0 ms. Since the secondary serving cell 415-*d* does not have an HS-DPCCH and instead, uses HS-DPCCH$_1$ 413 for feedback signaling, there is an additional delay 453-*b* in feedback signaling, which may be equal to 12.5 slots or 8.33 ms.

In some cases, by taking into account the misalignment between the primary and serving cells 405-*d* and 415-*d*, and adjusting a start time for the secondary serving cell 415-*d* based on the delay 453-*b*, the feedback signaling of the primary and secondary serving cells 405-*d* and 415-*d* may be aligned. For example, after identifying the timing relationship between the primary and secondary serving cells 405-*d* and 415-*d*, a subframe 0 on HS-DPCCH$_1$ 413 carrying feedback messages for the subframe 0 of the HS-PDSCH 418 may be transmitted 20 slots, or 13.33 ms, after transmission of the subframe 0 of the HS-PDSCH 418, or 7.5 slots (5.0 ms) after transmission of the subframe 0 of the HS-PDSCH 418 if the secondary serving cell 415-*d* has an actual HS-DPCCH, which may be HS-DPCCH$_2$ 419. In some cases, this may result in adding a feedback delay for the secondary serving cell 415-*d* by 15.5 slots, or 10.33 ms for the first subframe (0), and/or a delay of 12.5 slots, or 8.33 ms for a second subframe (1), when feedback messages, e.g. ACK/NACK messages are grouped into 2 messages per bundle.

Figure 4F:
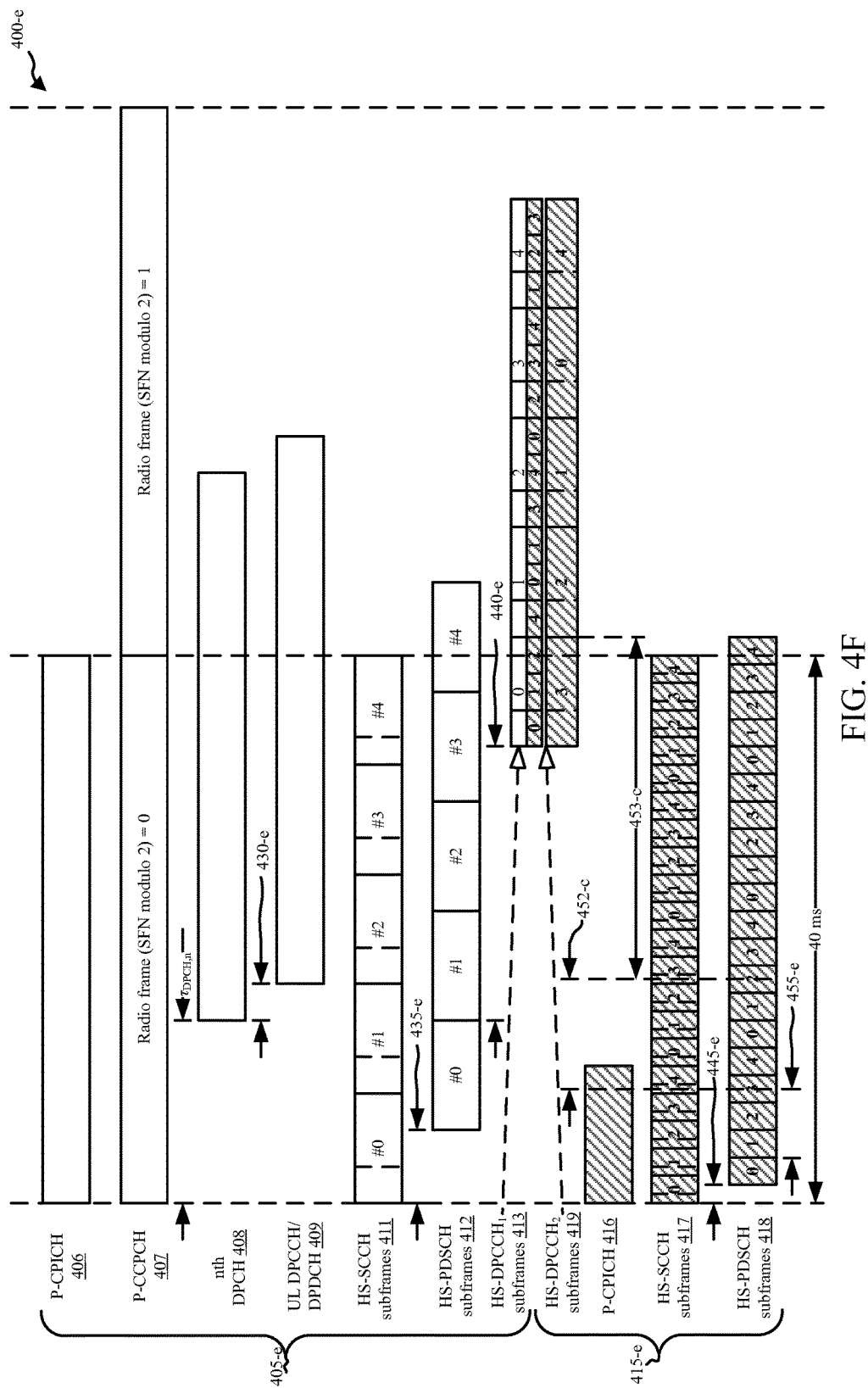
FIG. 4F shows a frame timing diagram of two channels having different scaling factors in accordance with various embodiments.

Turning next to FIG. 4F, a timing diagram illustrates a configuration 400-*e*, which may be similar to configuration 400-*c*, without a timing advance for the HS-PDCCH, where for the primary serving cell 405-*e*, N=4, and for the secondary serving cell 415-*e*, N=1. For the primary serving cell 405-*e*, the start delay 430-*e* for the start of a frame on the UL DPCCH/DPDCH 409 after a start time of a frame of an nth DPCH 408 may equal 1024 dilated chips, or 1066.67 μs. A subframe on the HS-PDSCH 412 may start transmitting a time 435-*d* after a subframe on the HS-SCCH 411, for example 2 dilated slots, which may be equivalent to 5.33 ms. In some embodiments, a subframe on the HS-DPCCH 413 may be transmitted after a subframe on the HS-PDSCH 412. In some cases, this delay 440-*e* may be measured relative to the start time of a subframe 1 and may be in the range of 7.5 dilated slots+(0 to 255) dilated chips, or 20.0 ms+(0 to 265.6) μs. A subframe on the HS-PDSCH 418 may be transmitted after a subframe on the HS-SCCH 417. In some cases, this delay 445-*e* may be measured relative to the start time of a subframe 0 and may be equal to 2 slots, or for an N=1 cell, 1.33 ms.

In some embodiments, a time 455-*e* for the secondary serving cell 415-*e*, which may represent a time between the end of a transmission time for subframe 0 on the HS-PDSCH 418 and the start of subframe 0 on the potential HS-DPCCH$_2$ 419 that may carry feedback information, may be 7.5 slots+(0 to 255) chips, or 5.0 ms+(0 to 66.4) μs. As this is different from a corresponding time 440-*e* for the primary serving cell 405-*e* between the beginning of subframe 1 of the HS-PDSCH 412 and the beginning of subframe 0 of the HS-DPCCH$_1$ 413, misalignment between HS-DPCCH$_1$ 413 and the potential HS-DPCCH$_2$ 419 may exist. For example, a time 452-*c* may represent the time it would have taken to send ACK/NACKs for subframes 0, 1, 2, and 3 for secondary serving cell 415-*e* if the secondary serving cell 415-*e* had an HS-DPCCH, which may be represented by HS-DPCCH$_2$ 419. Time 452-*c* may be equal to 12 slots, or 8.0 ms. Since the secondary serving cell 415-*e* may not have an HS-DPCCH and, instead, may use HS-DPCCH$_1$ 413 for feedback signaling, there may be an additional delay 453-*c* in feedback signaling, which may be equal to 37.5 slots or 25.0 ms.

In some cases, by taking into account the misalignment between the primary and serving cells 405-*e* and 415-*e*, and adjusting a start time for the secondary serving cell 415-*e* based on the delay 453-*c*, the feedback signaling of the primary and secondary serving cells 405-*e* and 415-*e* may be aligned. For example, after identifying the timing relationship between the primary and secondary serving cells 405-*e* and 415-*e*, a subframe 0 on HS-DPCCH$_1$ 413 carrying feedback messages for the subframe 0 of the HS-PDSCH 418 may be transmitted 37.5 slots, or 25.0 ms, after transmission of the subframe 0 of the HS-PDSCH 418, or 7.5 slots (5.0 ms) after transmission of the subframe 0 of the HS-PDSCH 418 if the secondary serving cell 415-*e* has an actual HS-DPCCH, which may be HS-DPCCH$_2$ 419. In some cases, this may result in adding a feedback delay for the secondary serving cell 415-*e* of 39 slots, or 26.0 ms for the first subframe (0), a delay of 24 slots, or 5.0 ms for a second subframe (1, a delay of 33 slots, or 22.0 ms for a third subframe (2), and/or a delay of 30 slots, or 20.0 ms for a second subframe (3), when feedback messages, e.g. ACK/NACK messages are grouped into 4 messages per bundle.

Figure 5A:
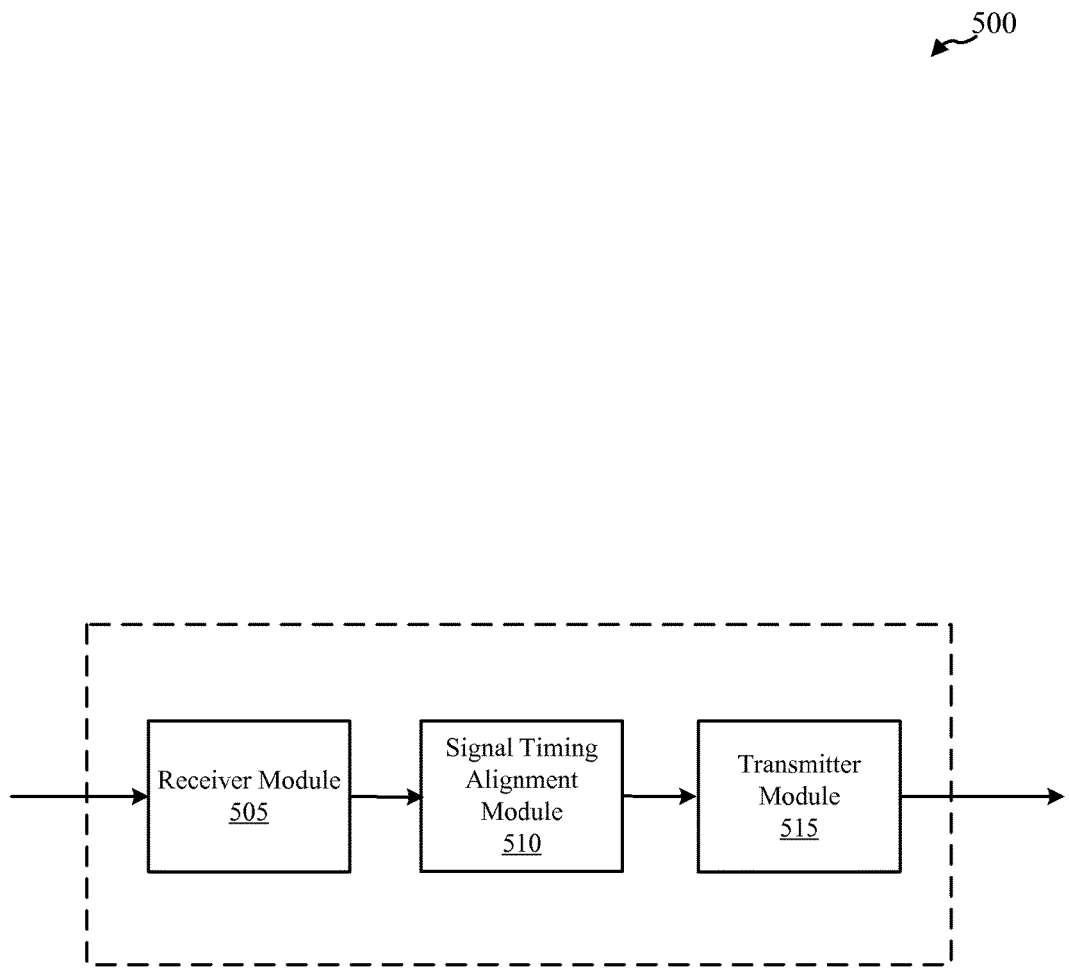
FIG. 5A shows a block diagram of a device configured for signaling alignment in a multicarrier system that utilizes flexible bandwidth carrier(s) in accordance with various embodiments.

Turning next to FIG. 5A, a block diagram illustrates a device 500 that includes signaling alignment functionality in a multicarrier system that utilizes one or more flexible bandwidth carriers in accordance with various embodiments. The device 500 may be an example of aspects of: the base stations 105 of FIG. 1, FIG. 2A, FIG. 2B, and/or FIG. 3, and/or the user equipment 115 of FIG. 1, FIG. 2A, FIG. 2B, and/or FIG. 3, and/or the controller 120/core network 130 of FIG. 1; and or aspects of systems 400, 400-*a*, 400-*b*, 400-*c*, 400-*d*, 400-*e* of FIGS. 4A, 4B, 4C, 4D, 4E, and/or 4F. The device 500 may include a receiver module 505, a signal timing alignment module 510, and a transmitter module 515. Each of these components may be in communication with each other.

These components of the device 500 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505 may receive information such as packet, data, and/or signaling information regarding what device 500 has received. The received information may be utilized by the device 500 for different purposes. The transmitter module 515 may transmit information such as packets, data, or signaling information regarding what device 500 has processed. The transmitted information may be utilized by various network entities for different purposes, as described below.

The signal timing alignment module 510 may be configured to identify timing for one or more subframes that carry one or more feedback messages, such as ACK/NACK messages, for a first cell. The signal timing alignment module 510 may also be configured to adjust a timing for one or more subframes that carry one or more feedback messages for a second cell to align with the one or more subframes that carry the one or more feedback messages for the first cell. At least the first cell or the second cell may include at least one or more flexible bandwidth carriers.

In some embodiments, adjusting the timing for the one or more subframes for the second cell utilizing the signal timing alignment module 510 reduces a delay for the one or more feedback messages, for example ACK/NACK messages, for the second cell relative to a standalone carrier cell. In some embodiments, adjusting the timing for the one or more subframes for the second cell utilizing the signal timing alignment module 510 includes and/or may require an increase in a capacity of a resource used for the one or more feedback messages for both the first cell and the second cell when a bandwidth of the second cell is greater than a flexible bandwidth of the first cell. In some embodiments, adjusting the timing for the one or more subframes for the second cell utilizing the signal timing alignment module 510 may include and/or may require a decrease in a capacity of a resource used for the one or more feedback messages for both the first cell and second cell when a flexible or scalable bandwidth of the second cell is less than a bandwidth of the first cell.

In some embodiments, the first cell includes a normal bandwidth carrier and the second cell may include one or more flexible bandwidth carriers. In some embodiments, the first cell may include a flexible bandwidth carrier and the second cell may include one or more flexible bandwidth carriers different from the first cell. In some cases, the flexible bandwidth of the first cell is greater than the flexible bandwidth of the second cell.

In some embodiments, the first cell includes one or more flexible bandwidth carriers and the second cell includes a normal bandwidth carrier. In some embodiments, the first cell includes one or more flexible bandwidth carriers and the second cell includes one or more flexible bandwidth carriers different from the first cell. In some cases, the flexible bandwidth of the first cell is less than the flexible bandwidth of the second cell.

In some embodiments, the first cell includes a bandwidth scaling factor equal to 1 and the second cell includes a bandwidth scaling factor equal to 2 or 4. In other embodiments, the first cell includes a bandwidth scaling factor equal to 2 or 4 and the second cell includes a bandwidth scaling factor equal to 1.

Figure 5B:
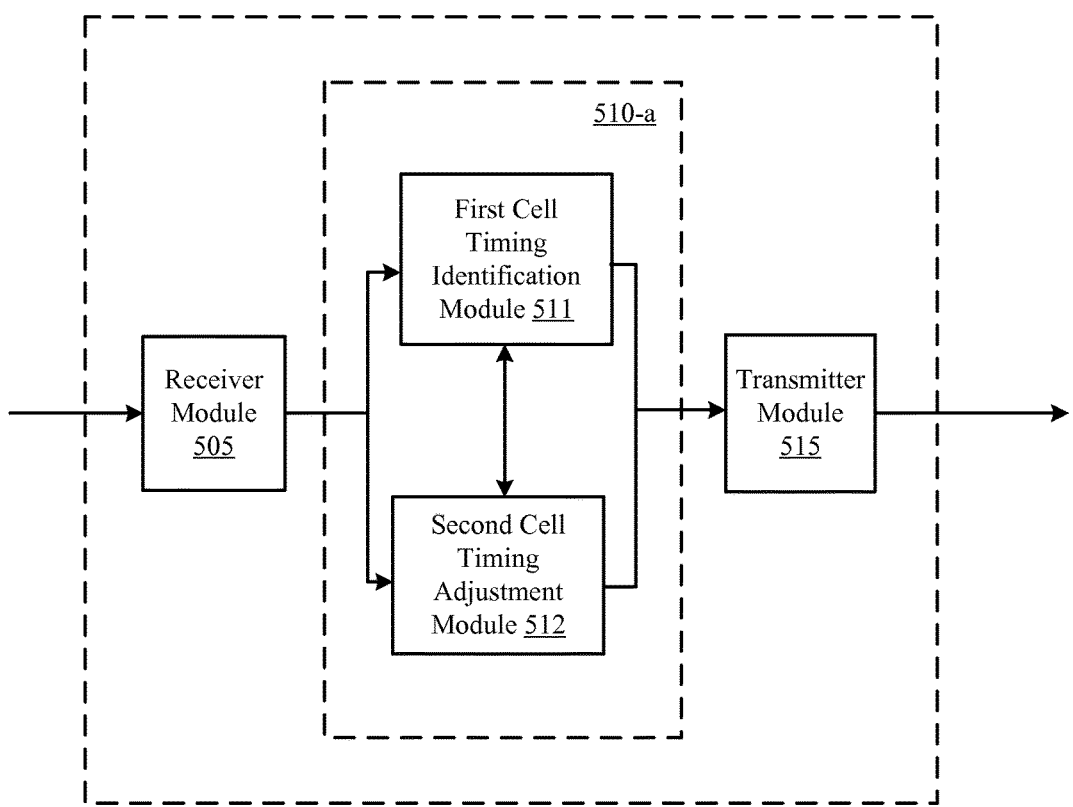
FIG. 5B shows a block diagram of another device configured for signaling alignment in a multicarrier system that utilizes flexible bandwidth carrier(s) in accordance with various embodiments.

Turning next to FIG. 5B, a block diagram illustrates a device 500-*a* that includes signaling alignment functionality in a multicarrier system that utilizes one or more flexible bandwidth carriers in accordance with various embodiments. The device 500-*a* may be an example of aspects of: the base stations 105 of FIG. 1, FIG. 2A, FIG. 2B, and/or FIG. 3, the user equipment 115 of FIG. 1, FIG. 2A, FIG. 2B, and/or FIG. 3, and/or the controller 120/core network 130 of FIG. 1; and or aspects of systems 400, 400-*a*, 400-*b*, 400-*c*, 400-*d*, 400-*e* of FIGS. 4A, 4B, 4C, 4D, 4E, and/or 4F. The device 500-*a* may include a receiver module 505, a first cell timing identification module 511, a second cell timing adjustment module 512, and a transmitter module 515. Each of these components may be in communication with each other. In some embodiments, the signal timing alignment module 510-*a*, which may incorporate some or all aspects of the signal timing alignment module 510 of FIG. 5A, may include the first cell timing identification module 511 and the second cell timing adjustment module 512. Device 500-*a* may include some or all aspects of, or may implement some or all of the functionality of, device 500 as described above in reference to FIG. 5A.

The components of the device 500-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505 may receive information such as packet, data, and/or signaling information regarding what device 500-*a* has received. The received information may be utilized by the device 500-*a* for different purposes. The transmitter module 515 may transmit information such as packets, data, or signaling information regarding what device 500-*a* has processed. The transmitted information may be utilized by various network entities for different purposes as described herein.

The first cell timing identification module 511 may be configured to identify timing for one or more subframes that carry one or more feedback messages, such as one or more ACK/NACK messages, for a first cell. The second cell timing adjustment module 512 may be configured to adjust a timing for one or more subframes that carry one or more feedback messages for a second cell to align with the one or more subframes that carry the one or more feedback messages for the first cell. At least the first cell or the second cell may include at least one or more flexible or scalable bandwidth carriers.

In some embodiments, adjusting the timing for the one or more subframes for the second cell utilizing the second cell timing adjustment module 512 reduces a delay for the one or more feedback messages for the second cell relative to a standalone carrier cell. In some cases, adjusting the timing for the one or more subframes for the second cell utilizing the second cell timing adjustment module 512 includes and/or may require an increase in a capacity of a resource used for the one or more feedback messages for both the first cell and the second cell when a bandwidth of the second cell is greater than a flexible bandwidth of the first cell. In other embodiments, adjusting the timing for the one or more subframes for the second cell utilizing the second cell timing adjustment module 512 may include and/or may require a decrease in a capacity of a resource used for the one or more feedback messages for both the first cell and second cell when a flexible bandwidth of the second cell is less than a bandwidth of the first cell.

In some embodiments, the first cell includes a normal bandwidth carrier and the second cell may include one or more flexible or scalable bandwidth carriers. In some embodiments, the first cell may include a flexible bandwidth carrier and the second cell may include one or more flexible bandwidth carriers different from the first cell. In some cases, the flexible bandwidth of the first cell is greater than the flexible bandwidth of the second cell.

In some embodiments, the first cell includes one or more flexible bandwidth carriers and the second cell includes a normal bandwidth carrier. In some embodiments, the first cell includes one or more flexible bandwidth carriers and the second cell includes one or more flexible bandwidth carriers different from the first cell. In some cases, the flexible bandwidth of the first cell is less than the flexible bandwidth of the second cell.

In some embodiments, the first cell includes a bandwidth scaling factor equal to 1 and the second cell includes a bandwidth scaling factor equal to 2 or 4. In other embodiments, the first cell includes a bandwidth scaling factor equal to 2 or 4 and the second cell includes a bandwidth scaling factor equal to 1.

Figure 6:
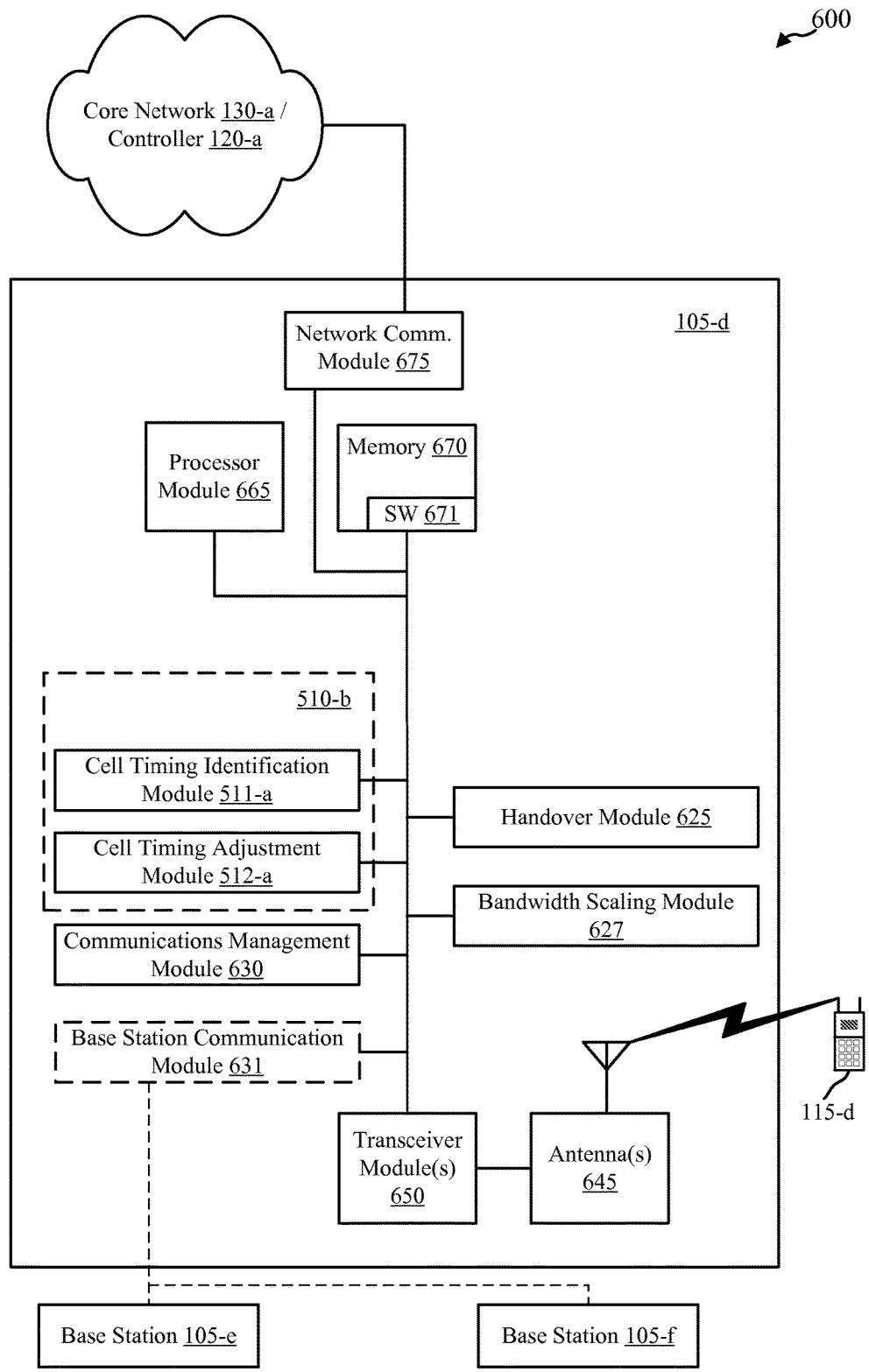
FIG. 6 shows a block diagram of a communications system configured in accordance with various embodiments.

FIG. 6 shows a block diagram of a communications system 600 that may be configured for signaling alignment in a multicarrier system that utilizes one or more flexible bandwidth carriers in accordance with various embodiments. This system 600 may include aspects of the system 100 depicted in FIG. 1, systems 200-*a* and 200-*b* of FIGS. 2A and 2B, system 300 of FIG. 3, and/or systems 400, 400-*a*, 400-*b*, 400-*c*, 400-*d*, 400-*e* of FIGS. 4A, 4B, 4C, 4D, 4E, and/or 4F; and/or devices 500 and 500-*a* of FIGS. 5A and/or 5B. The base station 105-*d* may include aspects of a controller 120-*a* and/or a core network 130-*a* in some cases. The base station 105-*d* may include antennas 645, a transceiver module 650, memory 670, and a processor module 665, which each may be in communication, directly or indirectly, with each other (e.g., over one or more buses). The transceiver module 650 may be configured to communicate bi-directionally, via the antennas 645, with the user equipment 115-*d*, which may be a multi-mode user equipment. The transceiver module 650 (and/or other components of the base station 105-*d*) may also be configured to communicate bi-directionally with one or more networks. In some cases, the base station 105-*d* may communicate with the network 130-*a* through network communications module 675. Base station 105-*d* may be an example of an eNodeB base station, a Home eNodeB base station, a NodeB base station, a Radio Network Controller (RNC), and/or a Home NodeB base station.

Base station 105-*d* may also communicate with other base stations 105, such as base station 105-*e* and base station 105-*f*. Each of the base stations 105 may communicate with user equipment 115-*d* using different wireless communications technologies, such as different Radio Access Technologies. In some cases, base station 105-*d* may communicate with other base stations such as 105-*e* and/or 105-*f* utilizing base station communication module 631. In some embodiments, base station communication module 631 may provide an X2 interface within an LTE wireless communication technology to provide communication between some of the base stations 105. In some embodiments, base station 105-*d* may communicate with other base stations through controller 120-*a* and/or network 130-*a*.

The memory 670 may include random access memory (RAM) and read-only memory (ROM). The memory 670 may also store computer-readable, computer-executable software code 671 containing instructions that are configured to, when executed, cause the processor module 665 to perform various functions described herein (e.g., call processing, database management, message routing, etc.). Alternatively, the software 671 may not be directly executable by the processor module 665 but be configured to cause the computer, e.g., when compiled and executed, to perform functions described herein.

The processor module 665 may include an intelligent hardware device, e.g., a central processing unit (CPU) such as those made by Intel® Corporation or AMD®, a microcontroller, an application-specific integrated circuit (ASIC), etc. The processor module 665 may include a speech encoder (not shown) configured to receive audio via a microphone, convert the audio into packets (e.g., 20 ms in length) representative of the received audio, provide the audio packets, and/or provide indications of whether a user is speaking.

The transceiver module 650 may include a modem configured to modulate the packets and provide the modulated packets to the antennas 645 for transmission, and to demodulate packets received from the antennas 645. While some examples of the base station 105-*d* may include a single antenna 645, the base station 105-*d* preferably includes multiple antennas 645 for multiple links which may support carrier aggregation. For example, one or more links may be used to support macro communications with user equipment 115-*d*.

According to the architecture of FIG. 6, the base station 105-*d* may further include a communications management module 630. By way of example, the communications management module 630 may be a component of the base station 105-*d* in communication with some or all of the other components of the base station 105-*d* via a bus. Alternatively, functionality of the communications management module 630 may be implemented as a component of the transceiver module 650, as a computer program product, and/or as one or more controller elements of the processor module 665.

The components for base station 105-*d* may be configured to implement aspects discussed above with respect to device 500 of FIG. 5A and/or device 500-*a* of FIG. 5B and/or configurations of systems 400, 400-*a*, 400-*b*, 400-*c*, 400-*d*, 400-*e* of FIGS. 4A, 4B, 4C, 4D, 4E, and/or 4F and may not be repeated here for the sake of brevity. The cell timing identification module 511-*a* may be an example of the first cell timing identification module 511 of FIG. 5B. The cell timing adjustment module 512-*a* may be an example of the second cell timing adjustment module 512 of FIG. 5B. Furthermore, signal timing alignment module 510-*b*, which may include the cell timing identification module 511-*a* and the cell timing adjustment module 512-*a*, may be an example of the signal timing alignment module 510 of FIG. 5A and/or the signal timing alignment module 510-*a* of FIG. 5B.

The base station 105-*d* may also include a spectrum identification module (not shown). The spectrum identification module may be utilized to identify spectrum available for flexible bandwidth waveforms. In some embodiments, a handover module 625 may be utilized to perform handover procedures of the user equipment 115-*d* from one base station 105 to another. For example, the handover module 625 may perform a handover procedure of the user equipment 115-*d* from base station 105-*d* to another where normal waveforms are utilized between the user equipment 115-*d* and one of the base stations and flexible bandwidth waveforms are utilized between the user equipment and another base station. A bandwidth scaling module 627 may be utilized to scale and/or alter chip rates and/or time to generate flexible bandwidth waveforms.

In some embodiments, the transceiver module 650 in conjunction with antennas 645, along with other possible components of base station 105-*d*, may transmit and/or receive information regarding flexible bandwidth waveforms and/or scaling factors from the base station 105-*d* to the user equipment 115-*d*, to other base stations 105-*e*/105-*f*, or core network 130-*a*. In some embodiments, the transceiver module 650 in conjunction with antennas 645, along with other possible components of base station 105-*d*, may transmit and/or receive information to or from the user equipment 115-*d*, to or from other base stations 105-*e*/105-*f*, or core network 130-*a*, such as flexible bandwidth waveforms and/or scaling factors, such that these devices or systems may utilize flexible bandwidth waveforms.

Figure 7:
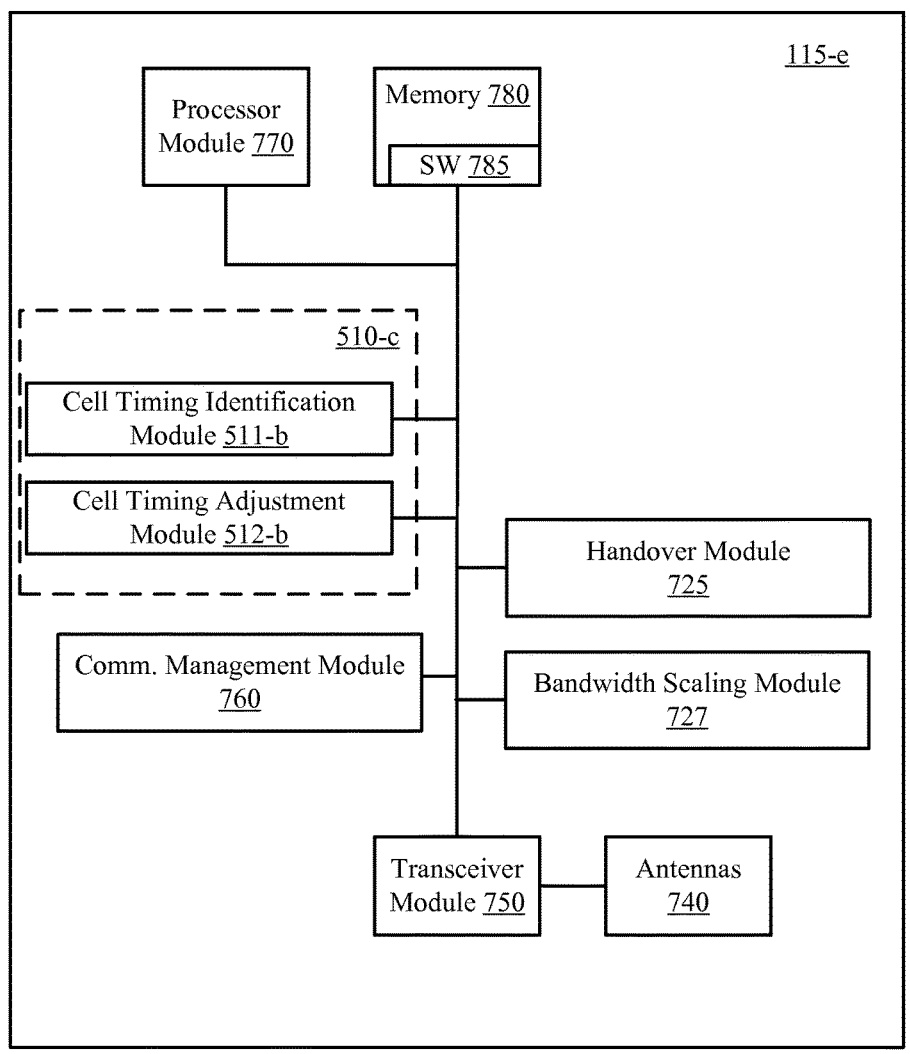
FIG. 7 shows a block diagram of a user equipment configured in accordance with various embodiments.

FIG. 7 is a block diagram 700 of a user equipment 115-*e* configured in accordance with various embodiments. The user equipment 115-*e* may have any of various configurations, such as personal computers (e.g., laptop computers, netbook computers, tablet computers, etc.), cellular telephones, PDAs, digital video recorders (DVRs), internet appliances, gaming consoles, e-readers, etc. The user equipment 115-*e* may have an internal power supply (not shown), such as a small battery, to facilitate mobile operation. In some embodiments, the user equipment 115-*e* may implement aspects of the system 100 depicted in FIG. 1, systems 200-*a* and 200-*b* of FIGS. 2A and 2B, system 300 of FIG. 3, systems 400, 400-*a*, 400-*b*, 400-*c*, 400-*d*, 400-*e* of FIGS. 4A, 4B, 4C, 4D, 4E, and/or 4F, and/or system 600 of FIG. 6; and/or devices 500 and 500-*a* of FIGS. 5A and/or 5B. The user equipment 115-*e* may be a multi-mode user equipment.

The user equipment 115-*e* may further be referred to as a wireless communications device in some cases.

The user equipment 115-*e* may include antennas 740, a transceiver module 750, memory 780, and a processor module 770, which each may be in communication, directly or indirectly, with each other (e.g., via one or more buses). The transceiver module 750 is configured to communicate bi-directionally, via the antennas 740 and/or one or more wired or wireless links, with one or more networks, as described above. For example, the transceiver module 750 may be configured to communicate bi-directionally with base stations 105 of FIG. 1, FIGS. 2A and 2B, FIG. 3, and/or FIG. 6, and/or with devices 500 and 500-*a* of FIGS. 5A and 5B. The transceiver module 750 may include a modem configured to modulate the packets and provide the modulated packets to the antennas 740 for transmission, and to demodulate packets received from the antennas 740. While the user equipment 115-*e* may include a single antenna, the user equipment 115-*e* will typically include multiple antennas 740 for multiple links.

The memory 780 may include random access memory (RAM) and read-only memory (ROM). The memory 780 may store computer-readable, computer-executable software code 785 containing instructions that are configured to, when executed, cause the processor module 770 to perform various functions described herein (e.g., call processing, database management, message routing, etc.). Alternatively, the software 785 may not be directly executable by the processor module 770 but may be configured to cause the computer (e.g., when compiled and executed) to perform functions described herein.

The processor module 770 may include an intelligent hardware device, e.g., a central processing unit (CPU) such as those made by Intel® Corporation or AMD®, a microcontroller, an application-specific integrated circuit (ASIC), etc. The processor module 770 may include a speech encoder (not shown) configured to receive audio via a microphone, convert the audio into packets (e.g., 20 ms in length) representative of the received audio, provide the audio packets to the transceiver module 750, and provide indications of whether a user is speaking. Alternatively, an encoder may only provide packets to the transceiver module 750, with the provision or withholding/suppression of the packet itself providing the indication of whether a user is speaking. The processor module 770 may also include a speech decoder that may perform a reverse functionality as the speech encoder.

According to the architecture of FIG. 7, the user equipment 115-*e* may further include a communications management module 760. The communications management module 760 may manage communications with other user equipments 115. By way of example, the communications management module 760 may be a component of the user equipment 115-*e* in communication with some or all of the other components of the user equipment 115-*e* via a bus. Alternatively, functionality of the communications management module 760 may be implemented as a component of the transceiver module 750, as a computer program product, and/or as one or more controller elements of the processor module 770.

The components for user equipment 115-*e* may be configured to implement aspects discussed above with respect to device 500 of FIG. 5A and/or device 500-*a* of FIG. 5B, system 600 of FIG. 6, and/or configurations of systems 400, 400-*a*, 400-*b*, 400-*c*, 400-*d*, 400-*e* of FIGS. 4A, 4B, 4C, 4D, 4E, and/or 4F, and may not be repeated here for the sake of brevity. The cell timing identification module 511-*b* may be an example of the first cell timing identification module 511 of FIG. 5B. The cell timing adjustment module 512-*b* may be an example of the second cell timing adjustment module 512 of FIG. 5B. Furthermore, signal timing alignment module 510-*c*, which may include the cell timing identification module 511-*b* and the cell timing adjustment module 512-*b*, may be an example of the signal timing alignment module 510 of FIG. 5A and/or the signal timing alignment module 510-*a* of FIG. 5B.

The user equipment 115-*e* may also include a spectrum identification module (not shown). The spectrum identification module may be utilized to identify spectrum available for flexible bandwidth waveforms. In some embodiments, a handover module 725 may be utilized to perform handover procedures of the user equipment 115-*e* from one base station to another. For example, the handover module 725 may perform a handover procedure of the user equipment 115-*e* from one base station to another where normal waveforms are utilized between the user equipment 115-*e* and one of the base stations and flexible bandwidth waveforms are utilized between the user equipment and another base station. A bandwidth scaling module 77 may be utilized to scale and/or alter chip rates and/or time to generate/decode flexible bandwidth waveforms.

In some embodiments, the transceiver module 750, in conjunction with antennas 740, along with other possible components of user equipment 115-*e*, may transmit information regarding flexible bandwidth waveforms and/or scaling factors from the user equipment 115-*e* to base stations or a core network. In some embodiments, the transceiver module 750, in conjunction with antennas 740, along with other possible components of user equipment 115-*e*, may transmit/receive information, such flexible bandwidth waveforms and/or scaling factors, to/from base stations or a core network such that these devices or systems may utilize flexible bandwidth waveforms.

Figure 8:
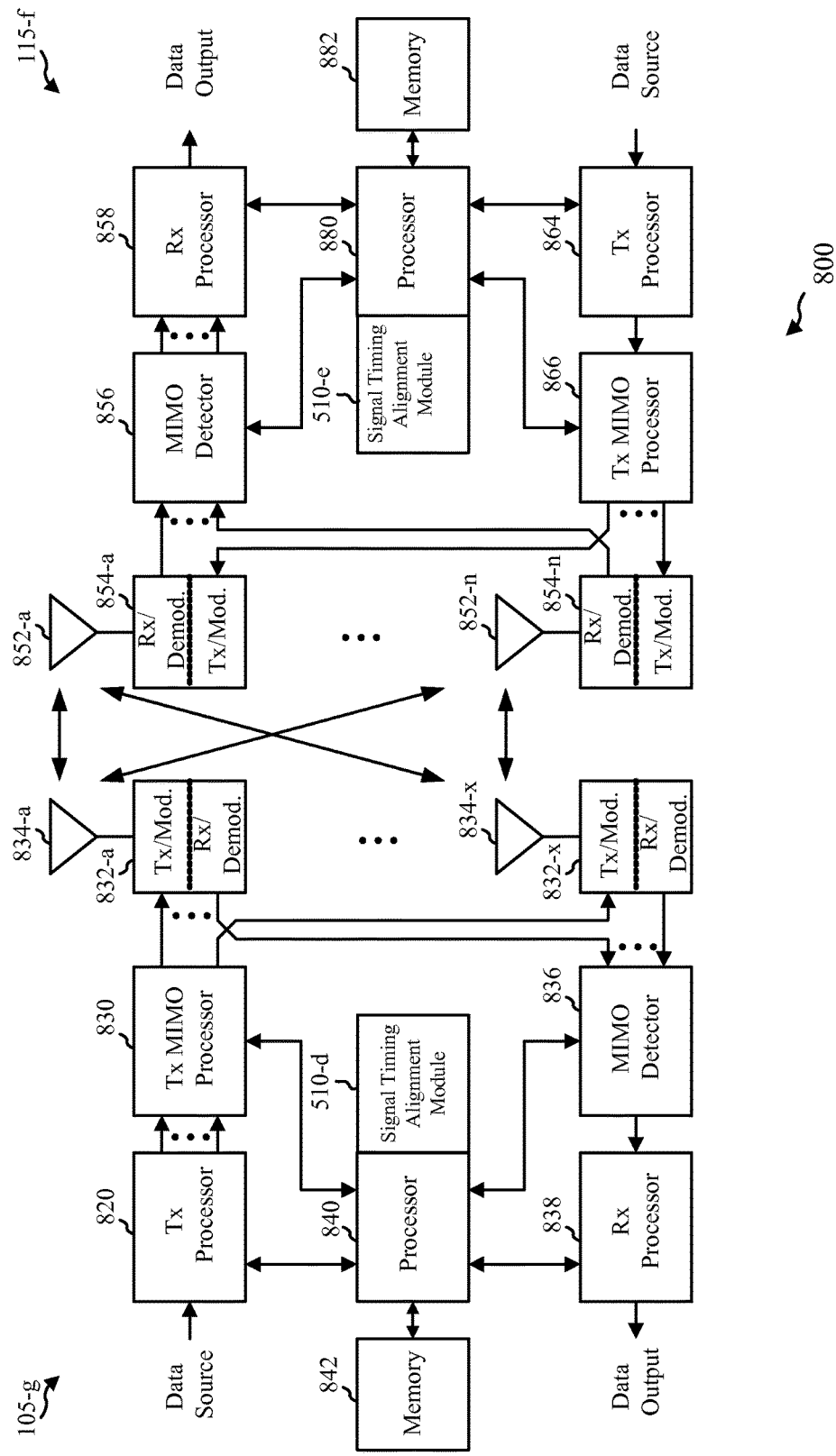
FIG. 8 shows a block diagram of a wireless communications system that includes a base station and a user equipment in accordance with various embodiments.

FIG. 8 is a block diagram of a system 800 including a base station 105-*g* and a user equipment 115-*f* in accordance with various embodiments. The system 800 may be an example of the system 100 of FIG. 1, systems 200-*a* and 200-*b* of FIGS. 2A and 2B, system 300 of FIG. 3, system 600 of FIG. 6, system 700 of FIG. 7, and/or devices 500 and 500-*a* of FIGS. 5A and 5B. The base station 105-*g* may be equipped with antennas 834-*a* through 834-*x*, and the user equipment 115-*f* may be equipped with antennas 852-*a* through 852-*n*. At the base station 105-*g*, a transmit processor 820 may receive data from a data source. System 800 may be configured to implement different aspects of the call flows and/or systems as shown in FIGS. 4A, 4B, 4C, 4D, 4E, and/or 4F and/or associated description.

The transmit processor 820 may process the data. The transmit processor 820 may also generate reference symbols, and a cell-specific reference signal. A transmit (TX) MIMO processor 830 may perform spatial processing (e.g., precoding) on data symbols, control symbols, and/or reference symbols, if applicable, and may provide output symbol streams to the transmit modulators 832-*a* through 832-*x*. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a downlink (DL) signal. In one example, DL signals from modulators 832-*a* through 832-*x* may be transmitted via the antennas 834-*a* through 834-*x*, respectively. The transmit processor 820 may receive information from a processor 840. The processor 840 may be coupled with a memory 842. The processor 840 may be configured to generate flexible bandwidth waveforms through altering a chip rate and/or utilizing a scaling factor. In some embodiments, the processor module 840 may be configured for dynamically adapting flexible bandwidth in accordance with various embodiments. The processor 840 may dynamically adjust one or more scale factors of the flexible bandwidth signal associated with transmissions between base station 105-g and user equipment 115-f. These adjustments may be made based on information such as traffic patterns, interference measurements, etc.

For example, within system 800, the processor 840 may further include a signal timing alignment module 510-d configured to identify timing for one or more subframes that carry one or more feedback messages for a first cell. The signal timing alignment module 510-d may also be configured to adjust a timing for one or more subframes that carry one or more feedback messages for a second cell to align with the one or more subframes that carry the one or more feedback messages for the first cell. At least the first cell or the second cell may include at least one of the one or more flexible bandwidth carriers. The signal timing alignment module 510-d may be an example of or may incorporate aspects of the signal timing alignment module 510, 510-a, 510-b, and 510-c of FIGS. 5A, 5B, 6, and/or 7.

At the user equipment 115-f, the user equipment antennas 852-a through 852-n may receive the DL signals from the base station 105-g and may provide the received signals to the demodulators 854-a through 854-n, respectively. Each demodulator 854 may condition (e.g., filter, amplify, down-convert, and digitize) a respective received signal to obtain input samples. Each demodulator 854 may further process the input samples (e.g., for OFDM, etc.) to obtain received symbols. A MIMO detector 856 may obtain received symbols from all the demodulators 854-a through 854-n, perform MIMO detection on the received symbols, if applicable, and provide detected symbols. A receive processor 858 may process (e.g., demodulate, deinterleave, and decode) the detected symbols, providing decoded data for the user equipment 115-f to a data output, and provide decoded control information to a processor 880, or memory 882.

On the uplink (UL) or reverse link, at the user equipment 115-f, a transmit processor 864 may receive and process data from a data source. The transmitter processor 864 may also generate reference symbols for a reference signal. The symbols from the transmit processor 864 may be precoded by a transmit MIMO processor 866, if applicable, further processed by the demodulators 854-a through 854-n (e.g., for SC-FDMA, etc.), and be transmitted to the base station 105-g in accordance with the transmission parameters received from the base station 105-g. The transmit processor 864 may also be configured to generate flexible bandwidth waveforms through altering a chip rate and/or utilizing a scaling factor; this may be done dynamically in some cases. The transmit processor 864 may receive information from processor 880. The processor 880 may provide for different alignment and/or offsetting procedures. The processor 880 may also utilize scaling and/or chip rate information to perform measurements on the other subsystems, perform handoffs to the other subsystems, perform reselection, etc. The processor 880 may invert the effects of time stretching associated with the use of flexible bandwidth through parameter scaling. At the base station 105-g, the UL signals from the user equipment 115-f may be received by the antennas 834, processed by the demodulators 832, detected by a MIMO detector 836, if applicable, and further processed by a receive processor 838. The receive processor 838 may provide decoded data to a data output and to the processor 840. In some embodiments, the processor 840 may be implemented as part of a general processor, the transmit processor 830, and/or the receiver processor 838.

In some embodiments, the processor module 880 may be configured for dynamically adapting flexible bandwidth in accordance with various embodiments. The processor 880 may dynamically adjust one or more scale factors of the flexible bandwidth signal associated with transmissions between base station 105-g and user equipment 115-f. These adjustments may be made based on information such as traffic patterns, interference measurements, etc.

For example, within system 800, the processor 880 may further include a signal timing alignment module 510-e configured to identify timing for one or more subframes that carry one or more feedback messages for a first cell. The signal timing alignment module 510-d may also be configured to adjust a timing for one or more subframes that carry one or more feedback messages for a second cell to align with the one or more subframes that carry the one or more feedback messages for the first cell. At least the first cell or the second cell may include at least one of the one or more flexible bandwidth carriers. The signal timing alignment module 510-d may be an example of or may incorporate aspects of the signal timing alignment module 510, 510-a, 510-b, and 510-c of FIGS. 5A, 5B, 6, and/or 7. Furthermore, the signal timing alignment module 510-e may coordinate and/or share functionality with the signal timing alignment module 510-d.

Figure 9A:
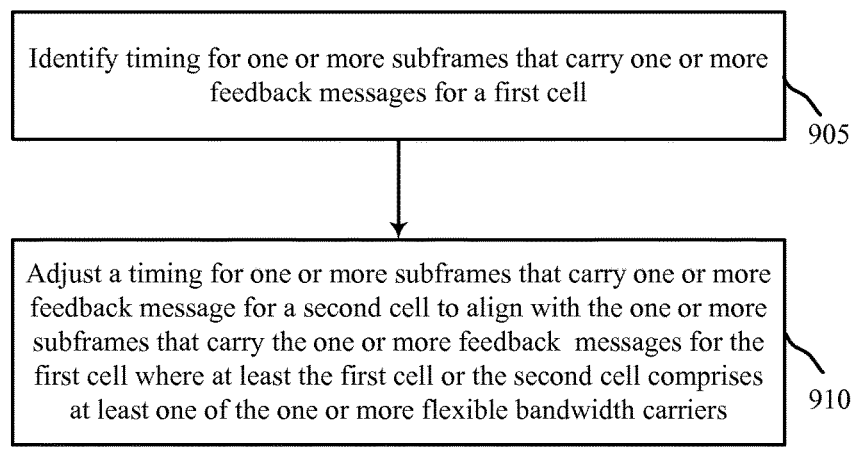
FIG. 9A shows a flow diagram of a method of signaling alignment in a multicarrier system that utilizes flexible bandwidth carrier(s) in accordance with various embodiments.

Turning to FIG. 9A, a flow diagram of a method 900 for signaling alignment in a multicarrier system that utilizes one or more flexible bandwidth carriers is provided in accordance with various embodiments. Method 900 may be implemented utilizing various wireless communications devices and/or systems including, but not limited to: system 100 of FIG. 1, systems 200-a and 200-b of FIGS. 2A and 2B, system 300 of FIG. 3, systems 400, 400-a, 400-b, 400-c, 400-d, 400-e of FIGS. 4A, 4B, 4C, 4D, 4E, and/or 4F, system 600 of FIG. 6, system 700 of FIG. 7, and/or system 800 of FIG. 8; the base stations 105 of FIG. 1, FIG. 2A, FIG. 2B, FIG. 3, FIG. 6, and/or FIG. 8; the user equipment 115 of FIG. 1, FIG. 2A, FIG. 2B, FIG. 3, FIG. 6, FIG. 7, and/or FIG. 8; the controller 120/core network 130 of FIGS. 1 and/or 6; and/or devices 500 and 500-a of FIGS. 5A and 5B.

At block 905, timing for one or more subframes that carry one or more feedback messages for a first cell may be identified.

At block 910, a timing for one or more subframes that carry one or more feedback messages for a second cell may be adjusted to align with the one or more subframes that carry the one or more feedback messages for the first cell. At least the first cell or the second cell may include at least one of the one or more flexible bandwidth carriers.

In some embodiments, adjusting the timing for the one or more subframes for the second cell may reduce a delay for the one or more feedback messages for the second cell relative to a standalone carrier cell. Adjusting the timing for the one or more subframes for the second cell may include/ require an increase in a capacity of a resource (e.g. transmission time delay) used for the one or more feedback messages for both the first cell and the second cell, when a bandwidth of the second cell is greater than a flexible bandwidth of the first cell. In some cases, adjusting the timing for the one or more subframes for the second cell may include/require a decrease in a capacity of a resource (e.g. transmission time delay) used for the one or more feedback messages for both the first cell and second cell when a flexible bandwidth of the second cell is less than a bandwidth of the first cell.

In some embodiments, the first cell may include a normal bandwidth carrier and the second cell may include one or more flexible bandwidth carriers. In other embodiments, the first cell may include a flexible bandwidth carrier and the second cell may include one or more flexible bandwidth carriers different from the first cell. In some cases, the flexible bandwidth of the first cell is greater than the flexible bandwidth of the second cell.

The methods for signaling alignment can also be beneficially implemented when the first cell may include one or more flexible bandwidth carriers and the second cell may include a normal bandwidth carrier. In some cases, the first cell may include one or more flexible bandwidth carriers and the second cell may include one or more flexible bandwidth carriers different from the first cell. The flexible bandwidth of the first cell may be less than the flexible bandwidth of the second cell.

In yet other cases, the methods described can be implemented where the first cell includes a bandwidth scaling factor equal to 1 and the second cell includes a bandwidth scaling factor equal to 2 or 4. In some cases, the first cell may include a bandwidth scaling factor equal to 2 or 4 and the second cell may include a bandwidth scaling factor equal to 1.

Figure 9B:
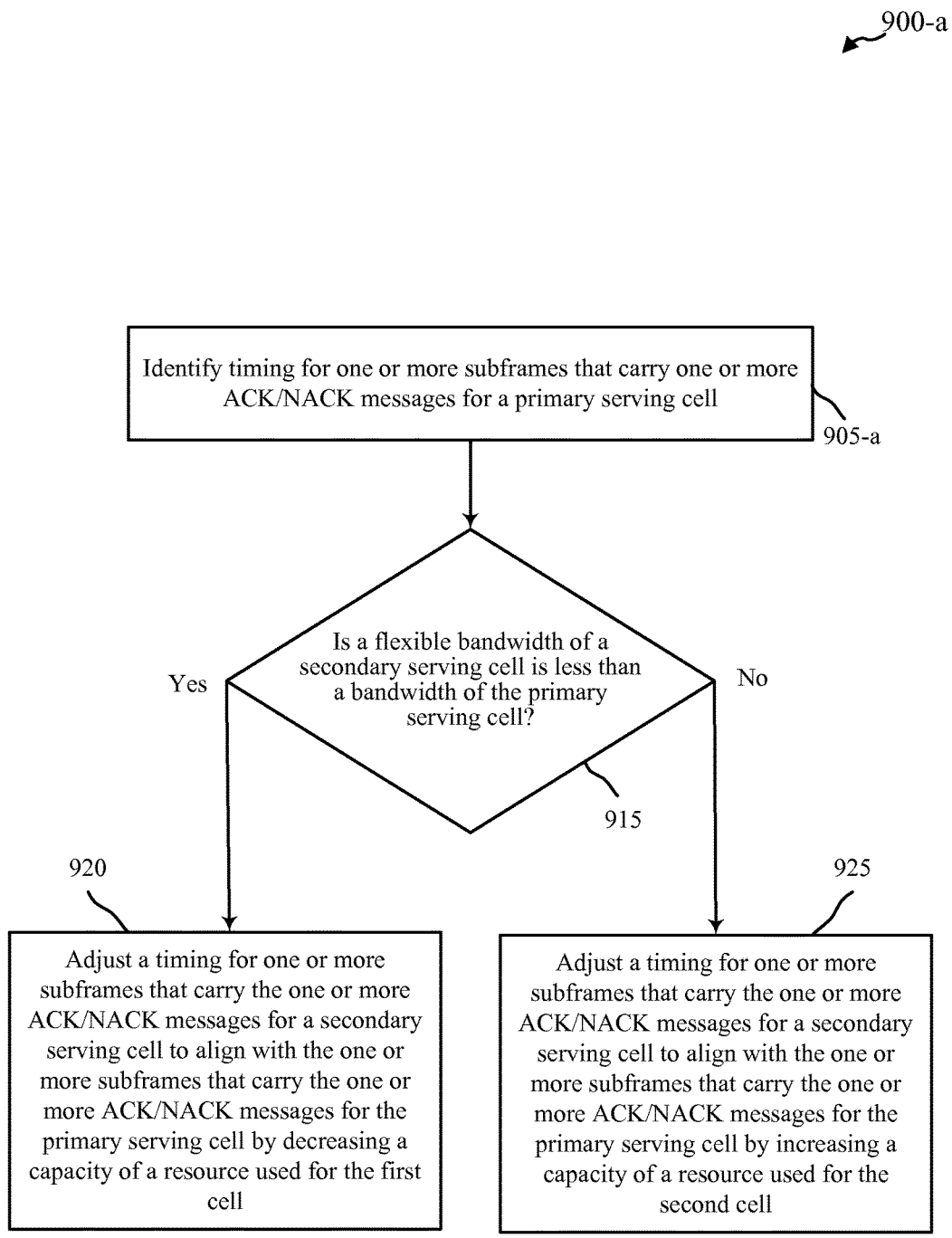
FIG. 9B shows a flow diagram of another method of signaling alignment in a multicarrier system that utilizes flexible bandwidth carrier(s) in accordance with various embodiments.

Turning to FIG. 9B, a flow diagram of a method 900-a for signaling alignment in a multicarrier system that utilizes one or more flexible bandwidth carriers is provided in accordance with various embodiments. Method 900-a may be implemented utilizing various wireless communications devices and/or systems including, but not limited to: system 100 of FIG. 1, systems 200-a and 200-b of FIGS. 2A and 2B, system 300 of FIG. 3, systems 400, 400-a, 400-b, 400-c, 400-d, 400-e of FIGS. 4A, 4B, 4C, 4D, 4E, and 4F, system 600 of FIG. 6, system 700 of FIG. 7, and/or system 800 of FIG. 8; the base stations 105 of FIG. 1, FIG. 2A, FIG. 2B, FIG. 3, FIG. 6, and/or FIG. 8; the user equipment 115 of FIG. 1, FIG. 2A, FIG. 2B, FIG. 3, FIG. 6, FIG. 7, and/or FIG. 8; the controller 120/core network 130 of FIGS. 1 and/or 6; and/or devices 500 and 500-a of FIGS. 5A and 5B. Method 900-a may be an example of method 900 of FIG. 9A.

At block 905-a, timing for one or more subframes that carry one or more ACK/NACK messages for a primary serving cell may be identified.

At block 915, it may be determined whether a flexible bandwidth of a secondary serving cell is less than a bandwidth of the primary serving cell.

If the flexible bandwidth of the secondary serving cell is less than a bandwidth of the primary serving cell, the method 900-a may proceed to block 920, where a timing for one or more subframes that carry the one or more ACK/NACK messages for a secondary serving cell is adjusted to align with the one or more subframes that carry the one or more ACK/NACK messages for the primary serving cell by decreasing a capacity of a resource used for the first cell.

If the flexible bandwidth of the secondary serving cell is not less than a bandwidth of the primary serving cell, the method 900-a may proceed to block 925, where a timing for one or more subframes that carry the one or more ACK/NACK messages for a secondary serving cell is adjusted to align with the one or more subframes that carry the one or more ACK/NACK messages for the primary serving cell by increasing a capacity of a resource used for the second cell.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of signaling alignment for a wireless communication device in a multicarrier system utilizing one or more flexible bandwidth carriers, the method comprising:
   identifying a timing for one or more subframes carrying one or more acknowledgment or negative-acknowledgment messages for a first cell; and
   adjusting a timing for one or more subframes carrying one or more acknowledgment or negative-acknowledgment messages for a second cell to align with the one or more subframes carrying the one or more acknowledgment or negative-acknowledgment messages for the first cell and to reduce a delay for the one or more acknowledgment or negative-acknowledgment messages for the second cell relative to a standalone carrier cell, wherein at least the first cell or the second cell comprises at least one of the one or more flexible bandwidth carriers, wherein a flexible bandwidth of the one or more flexible bandwidth carriers is scaled by a scaling factor with respect to a normal bandwidth system.

2. The method of claim 1, wherein adjusting the timing for the one or more subframes for the second cell comprises an increase in a capacity of a resource used for the one or more acknowledgment or negative-acknowledgment messages for both the first cell and the second cell when a bandwidth of the second cell is greater than a flexible bandwidth of the first cell.

3. The method of claim 1, wherein adjusting the timing for the one or more subframes for the second cell comprises a decrease in a capacity of a resource used for the one or more acknowledgment or negative-acknowledgment messages for both the first cell and second cell when a flexible bandwidth of the second cell is less than a bandwidth of the first cell.

4. The method of claim 1, wherein the first cell comprises a normal bandwidth carrier and the second cell comprises one of the one or more flexible bandwidth carriers.

5. The method of claim 1, wherein the first cell comprises one of the one or more flexible bandwidth carriers and the second cell comprises a normal bandwidth carrier.

6. The method of claim 1, wherein the first cell comprises one of the one or more flexible bandwidth carriers and the second cell comprises one of the one or more flexible bandwidth carriers different from the first cell.

7. The method of claim 4, wherein the first cell comprises a bandwidth scaling factor equal to 1 and the second cell comprises a bandwidth scaling factor equal to 2 or 4.

8. The method of claim 5, wherein the first cell comprises a bandwidth scaling factor equal to 2 or 4 and the second cell comprises a bandwidth scaling factor equal to 1.

9. A system for signaling alignment for a wireless communication device with multiple carriers utilizing one or more flexible bandwidth carriers, the system comprising:
   means for identifying a timing for one or more subframes carrying one or more acknowledgment or negative-acknowledgment messages for a first cell; and
   means for adjusting a timing for one or more subframes carrying one or more acknowledgment or negative-acknowledgment messages for a second cell to align with the one or more subframes carrying the one or more acknowledgment or negative-acknowledgment messages for the first cell and to reduce a delay for the one or more acknowledgment or negative-acknowledgment messages for the second cell relative to a standalone carrier cell, wherein at least the first cell or the second cell comprises at least one of the one or more flexible bandwidth carriers, wherein a flexible bandwidth of the one or more flexible bandwidth carriers is scaled by a scaling factor with respect to a normal bandwidth system.

10. The system of claim 9, wherein the means for adjusting the timing for the one or more subframes for the second cell comprises an increase in a capacity of a resource used for the one or more acknowledgment or negative-acknowledgment messages for both the first cell and the second cell when a bandwidth of the second cell is greater than a flexible bandwidth of the first cell.

11. The system of claim 9, wherein the means for adjusting the timing for the one or more subframes for the second cell comprises a decrease in a capacity of a resource used for the one or more acknowledgment or negative-acknowledgment messages for both the first cell and second cell when a flexible bandwidth of the second cell is less than a bandwidth of the first cell.

12. The system of claim 9, wherein the first cell comprises a normal bandwidth carrier and the second cell comprises one of the one or more flexible bandwidth carriers.

13. The system of claim 9, wherein the first cell comprises one of the one or more flexible bandwidth carriers and the second cell comprises a normal bandwidth carrier.

14. The system of claim 9, wherein the first cell comprises one of the one or more flexible bandwidth carriers and the second cell comprises one of the one or more flexible bandwidth carriers different from the first cell.

15. The system of claim 12, wherein the first cell comprises a bandwidth scaling factor equal to 1 and the second cell comprises a bandwidth scaling factor equal to 2 or 4.

16. The system for claim 13, wherein the first cell comprises a bandwidth scaling factor equal to 2 or 4 and the second cell comprises a bandwidth scaling factor equal to 1.

17. A non-transitory computer-readable medium storing code for signaling alignment in a wireless communications system, the code comprising instructions executable by a processor to:

identify a timing for one or more subframes carrying one or more acknowledgment or negative-acknowledgment messages for a first cell; and adjust a timing for one or more subframes carrying one or more acknowledgment or negative-acknowledgment messages for a second cell to align with the one or more subframes carrying the one or more acknowledgment or negative-acknowledgment messages for the first cell and to reduce a delay for the one or more acknowledgment or negative-acknowledgment messages for the second cell relative to a standalone carrier cell, wherein at least the first cell or the second cell comprises at least one of one or more flexible bandwidth carriers, wherein a flexible bandwidth of the one or more flexible bandwidth carriers is scaled by a scaling factor with respect to a normal bandwidth system.

18. The non-transitory computer-readable medium of claim 17, wherein the instructions executable to adjust the timing for the one or more subframes for the second cell are further executable to increase a capacity of a resource used for the one or more acknowledgment or negative-acknowledgment messages for both the first cell and the second cell when a bandwidth of the second cell is greater than a flexible bandwidth of the first cell.

19. The non-transitory computer-readable medium of claim 17, wherein the instructions executable to adjust the timing for the one or more subframes for the second cell are further executable to decrease a capacity of a resource used for the one or more acknowledgment or negative-acknowledgment messages for both the first cell and second cell when a flexible bandwidth of the second cell is less than a bandwidth of the first cell.

20. The non-transitory computer-readable medium of claim 17, wherein the first cell comprises a normal bandwidth carrier and the second cell comprises one of the one or more flexible bandwidth carriers.

21. The non-transitory computer-readable medium of claim 17, wherein the first cell comprises one of the one or more flexible bandwidth carriers and the second cell comprises a normal bandwidth carrier.

22. The non-transitory computer-readable medium of claim 17, wherein the first cell comprises one of the one or more flexible bandwidth carriers and the second cell comprises one of the one or more flexible bandwidth carriers different from the first cell.

23. The non-transitory computer-readable medium of claim 20, wherein the first cell comprises a bandwidth scaling factor equal to 1 and the second cell comprises a bandwidth scaling factor equal to 2 or 4.

24. The non-transitory computer-readable medium of claim 21, wherein the first cell comprises a bandwidth scaling factor equal to 2 or 4 and the second cell comprises a bandwidth scaling factor equal to 1.

25. A wireless communications device configured for signaling alignment in a wireless communications system, the wireless communications device comprising:
at least one processor;
memory in electronic communication with the at least one processor; and
instructions stored in the memory and operable, when executed by the at least one processor, to cause the wireless communications device to;
identify a timing for one or more subframes carrying one or more acknowledgment or negative-acknowledgment messages for a first cell; and
adjust a timing for one or more subframes carrying one or more acknowledgment or negative-acknowledgment messages for a second cell to align with the one or more subframes carrying the one or more acknowledgment or negative-acknowledgment messages for the first cell and to reduce a delay for the one or more acknowledgment or negative-acknowledgment messages for the second cell relative to a standalone carrier cell, wherein at least the first cell or the second cell comprises at least one of one or more flexible bandwidth carriers, wherein a flexible bandwidth of the one or more flexible bandwidth carriers is scaled by a scaling factor with respect to a normal bandwidth system.

26. The method of claim 1, wherein adjusting the timing for the one or more subframes for the second cell comprises an increase in a capacity of a resource used for the one or more acknowledgment or negative-acknowledgment messages for both the first cell and the second cell when a bandwidth of the second cell is greater than a flexible bandwidth of the first cell.

27. The wireless communications device of claim 25, wherein adjusting the timing for the one or more subframes for the second cell comprises a decrease in a capacity of a resource used for the one or more acknowledgment or negative-acknowledgment messages for both the first cell and second cell when a flexible bandwidth of the second cell is less than a bandwidth of the first cell.

28. The wireless communications device of claim 25, wherein the first cell comprises a normal bandwidth carrier and the second cell comprises one of the one or more flexible bandwidth carriers.

29. The wireless communications device of claim 25, wherein the first cell comprises one of the one or more flexible bandwidth carriers and the second cell comprises a normal bandwidth carrier.

30. The wireless communications device of claim 25, wherein the first cell comprises one of the one or more flexible bandwidth carriers and the second cell comprises one of the one or more flexible bandwidth carriers different from the first cell.

31. The wireless communications device of claim 28, wherein the first cell comprises a bandwidth scaling factor equal to 1 and the second cell comprises a bandwidth scaling factor equal to 2 or 4.

32. The wireless communications device of claim 29, wherein the first cell comprises a bandwidth scaling factor equal to 2 or 4 and the second cell comprises a bandwidth scaling factor equal to 1.

* * * * *